(12) United States Patent
Rüfli

(10) Patent No.: US 12,296,904 B2
(45) Date of Patent: May 13, 2025

(54) VEHICLE

(71) Applicant: Franz Rüfli, Schnottwil (CH)

(72) Inventor: Franz Rüfli, Schnottwil (CH)

( * ) Notice: Subject to any disclaimer, the term of this patent is extended or adjusted under 35 U.S.C. 154(b) by 581 days.

(21) Appl. No.: 17/629,525

(22) PCT Filed: Jul. 24, 2020

(86) PCT No.: PCT/EP2020/071010
§ 371 (c)(1),
(2) Date: Jan. 24, 2022

(87) PCT Pub. No.: WO2021/018785
PCT Pub. Date: Feb. 4, 2021

(65) Prior Publication Data
US 2022/0242507 A1    Aug. 4, 2022

(30) Foreign Application Priority Data

Jul. 26, 2019 (CH) ..................................... 00959/19

(51) Int. Cl.
*B62D 61/12* (2006.01)
*B62D 47/00* (2006.01)

(52) U.S. Cl.
CPC ........... *B62D 61/12* (2013.01); *B62D 47/006* (2013.01)

(58) Field of Classification Search
CPC ...... B62D 61/12; B62D 47/006; B62D 33/04; B62D 61/02; B62D 61/04; B62D 61/00; B62D 63/02; B60B 19/00; B62K 13/00
See application file for complete search history.

(56) References Cited

U.S. PATENT DOCUMENTS 2,372,043 A * 3/1945 Aghnides ................ F41H 7/044
180/21
3,777,835 A * 12/1973 Bourne .................. A63B 19/02
D12/1

(Continued)

FOREIGN PATENT DOCUMENTS

CN          204223083 U     3/2015
EP            3025882 A1    6/2016

(Continued)

OTHER PUBLICATIONS

JP-H0692273-A English Translation (Year: 1994).*

(Continued)

*Primary Examiner* — James A Shriver, II
*Assistant Examiner* — Michael T. Walsh
(74) *Attorney, Agent, or Firm* — Benesch Friedlander Coplan & Aronoff LLP

(57) ABSTRACT

A vehicle includes a first vehicle part including a first running wheel rotatable about a first axis of rotation and a second vehicle part including a second running wheel rotatable about a second axis of rotation. The first and second running wheels have the same running-wheel diameter. A first and second bearing means for rotatably mounting the first and second running wheels are interconnected by means of a joint mechanism so that the orientation of the first and second axes of rotation relative to each other can be varied. By means of the joint mechanism, the vehicle can be transferred from a first driving configuration to a second driving configuration and from the second driving configuration to the first driving configuration while the vehicle is in motion. The conversion between the first and second driving configurations takes place automatically as a function of a driving speed of the vehicle.

18 Claims, 9 Drawing Sheets

(56) References Cited

U.S. PATENT DOCUMENTS

| | | | | |
|---|---|---|---|---|
| 5,769,441 | A | * 6/1998 | Namngani | B62K 17/00 |
| | | | | 280/211 |
| 6,976,899 | B1 | * 12/2005 | Tamanas | B62D 57/04 |
| | | | | 446/454 |
| 7,188,694 | B1 | * 3/2007 | Blair | B60B 19/06 |
| | | | | 180/218 |
| 2001/0042650 | A1 | 11/2001 | van den Berg | |
| 2004/0060759 | A1 | 4/2004 | Hume | |
| 2004/0182625 | A1 | 9/2004 | Pal | |

FOREIGN PATENT DOCUMENTS

| | | | |
|---|---|---|---|
| FR | 3063274 A1 | * | 8/2018 |
| JP | H0692273 A | * | 4/1994 |
| JP | 3148822 U | | 3/2009 |
| JP | 2013-22988 A | | 2/2013 |

OTHER PUBLICATIONS

FR-3063274-A1 English Translation (Year: 2018).*
International Preliminary Report on Patentability issued in PCT application PCT/EP2020/01010 dated Feb. 1, 2022.
Written Opinion of the International Searching Authority issued in PCT application PCT/EP2020/01010 mailing date Nov. 30, 2020.

* cited by examiner

VEHICLE

TECHNICAL FIELD

The invention relates to a vehicle comprising a first vehicle part and a second vehicle part, wherein the first vehicle part comprises a first running wheel rotatable about a first rotation axis, and wherein the second vehicle part comprises a second running wheel rotatable about a second rotation axis. The first running wheel and the second running wheel have identical running wheel diameters, and a first mounting for rotatably mounting the first running wheel and a second mounting for rotatably mounting the second running wheel are connected to one another by way of an articulated mechanism in such a manner that a relative mutual alignment of the first rotation axis and the second rotation axis is variable. The invention furthermore relates to a vehicle part for such a vehicle, to a vehicle assembly comprising at least two such vehicles, and to a method for transforming a vehicle.

PRIOR ART

Corresponding vehicles are known. The first rotation axis and the second rotation axis can be disposed behind one another, as is the case in a bicycle, or else be disposed next to one another in a common plane such that a "parallel bicycle" results. In the case of such parallel bicycles, models in which the running wheels are comparatively small and a platform for supporting a person is disposed between or above the wheels are known. In other models, the running wheels are large and laterally enclose a receptacle space, cf. for example US 2004/0060759 A1 (R. G. McKenzie Hume), US 2004/0182625 (A. K. Pal), EP 3 025 882 A1 (Shenzhen Zhiyou Battery Integration Technology Co., Ltd.).

Such models however usually have a limited field of application. Said models often have a significant level of aerodynamic and frictional resistance. The space requirement of said models is comparatively large, and the driving characteristics are not very dynamic, in particular in curves.

SUMMARY OF THE INVENTION

It is an object of the invention to achieve a vehicle associated with the technical field mentioned at the outset which eliminates mentioned disadvantages of the prior art.

The achievement of the object is defined by the features of claim 1. According to the invention, the vehicle with the aid of the articulated mechanism is able to be converted from a first driving configuration in which the first and the second rotation axis are mutually inclined to a second driving configuration in which the first and the second rotation axis are parallel, wherein in the second driving configuration a spacing of a first contact face of the first running wheel from a second contact face of the second running wheel is smaller than one tenth of the running wheel diameter.

The vehicle can thus be converted or transformed, respectively, from a dual-track driving configuration (first driving configuration), corresponding to a parallel bicycle, to a single-track driving configuration (second driving configuration), corresponding to a unicycle. Accordingly, this results in a stable configuration when stationary and when travelling at a slow speed, as well as a dynamic configuration having a minimized aerodynamic and rolling resistance and a dynamic steering capability for higher speeds.

The mentioned spacing relates to the spacing between the inner delimitations of the contact faces in the driving mode with a permissible payload. In the first driving configuration, the mutual inclination angle of the first and the second rotation axis is in particular at least 3°, preferably at least 5°. In the single-track driving configuration the angle is smaller than 2°, preferably smaller than 1°. The angle may also be slightly negative, that is to say that the contact faces of the two running wheels in the contact region of the two running wheels with the hard ground have a smaller mutual spacing than diametrically opposite said contact region.

The transition between the first and the second driving configuration takes place in particular in a stepless manner so that intermediate positions can be assumed temporarily or for a longer period.

The first running wheel and the second running wheel in the first driving configuration and/or in the second driving configuration preferably contact one another in the region of the circumference of said running wheels. The vehicle is stabilized as a result; a minimum width of the effective contact face moreover results in the second driving configuration. In the first driving configuration, the running wheels contact one another at a circumferential position which lies diametrically opposite the contact region with the hard ground. In contrast, the running wheels in the second driving configuration contact one another in the contact region. Configurations are possible in which the running wheels contact one another only in one of the driving configurations, for example by means of a pivot joint which is disposed in a plane that is higher or lower in terms of the rotation axes, and configurations in which the running wheels can contact one another in both driving configurations, for example by way of a pivot joint at a level with the rotation axes or by way of a mechanism which enables a modification of the mutual spacing of the running wheel hubs, for example a parallel kinematic.

Alternatively, the running wheels contact one another neither in the first nor in the second driving configuration.

In one preferred embodiment the first vehicle part and the second vehicle part are configured as planar lateral parts, in particular as half shells, which conjointly close a receptacle space, wherein a radial extent of the half shells is 75 to 100% of the running wheel diameter. The receptacle space can receive loads, objects and/or persons. Nothing has to be externally fastened to the vehicle parts, this resulting in a compact construction and positive aerodynamics. The lateral parts, and in particular the half shells, protect the loads and/or persons in the receptacle space in relation to external influences, for example rain or dust. Should the two half shells in the second driving configuration be able to be placed completely against one another and a seal be provided therebetween, an amphibious device results in the case of water-tight half shells. If suitable elements such as blades, for example, are provided on the running wheels, the vehicle can thus be amphibiously used.

In this case, the running wheel diameter is preferably at least 1.2 m, and the receptacle space comprises a platform for receiving at least one person. The platform can be configured as a standing platform, a seat or a recliner for example.

In other embodiments, the receptacle space is not or is only partially situated between the vehicle parts. For example, one platform or one superstructure is carried by two (or more) vehicles according to the invention having in each case two vehicle parts.

The conversion from the first to the second driving configuration and from the second to the first driving configuration is preferably possible while the vehicle is in motion. The vehicle can thus start travel from stationary in the first driving configuration, while the conversion to the second driving configuration then takes place as the speed increases. Conversion to the first configuration in turn takes place when the vehicle is decelerated. The configuration of the vehicle is thus at all times adapted to the current state of motion. The angle can be variably set as a function of the speed (and optionally further factors such as, for example, the road condition, the temperature or the weather conditions) in particular in the first driving configuration.

The conversion between the first driving configuration and the second driving configuration advantageously takes place automatically as a function of a driving speed of the vehicle. The correlation of the transition with the relative parameters in a first direction is ideally offset somewhat from the correlation in a second direction (hysteresis) such that an oscillating back and forth in the range of a parameter limit (for example at a specific driving speed) is avoided.

Embodiments in which the conversion is manually initiated and/or controlled are possible in particular in the case of manually driven vehicles or vehicles for the use in sports.

In one preferred embodiment the automatic conversion takes place by virtue of effective moments, without additional effective forces. This results in a particularly simple and reliable construction.

Alternatively provided is a motor or actuating drive (pneumatic or hydraulic, for example), respectively, for setting the inclination.

In one preferred embodiment each of the vehicle parts comprises an independently controllable motor. This enables construction having a small number of mechanical parts. Moreover, a symmetrical distribution of weight results already by virtue of the construction.

The steering during the operation in two rows (first driving configuration) takes place in particular with the aid of a speed differential between the two running wheels.

The steering in the operation in a single row (second driving configuration), with wheel modules that are mechanically fixedly connected, takes place in particular by means of shifting weight and asymmetrical force impulses. This here may be a shifting of the position of a driver and/or the manual or automatic shifting of rotating and/or non-rotating weight components and/or gyroscopic devices of the vehicle. The weight components in the case of electrically driven vehicles can in particular be energy storage units (batteries).

Alternatively, there is only one drive motor and the drive force is transmitted to the individual drive wheels by way of a differential gearbox, for example.

The motors are advantageously configured as electric motors, wherein a support device for loads to be received (persons and/or goods) is disposed on the inside of at least one stator of one of the motors. This results in a simple construction.

The electric motors are preferably torque motors. The latter enable a high torque at low rotating speeds and a small number of mechanical construction elements, specifically because a separate gearbox can be dispensed with.

Other electric motors (with or without an additional gearbox) are likewise possible.

Alternatively, other types of drives, for example hydraulic motors, are possible. Hybrid drives in which a drive motor is combined with a manual drive mechanism, as well as purely manual drives, are also possible.

In preferred embodiments a pivot axis of the articulated mechanism has a radial spacing from the first rotation axis and from the second rotation axis which is at least one third of the running wheel diameter, in particular at least 4/10 of the running wheel diameter. The pivot axis can be defined by a physical axle or by virtue of the geometry of the articulated mechanism be derived as a virtual axis. In the latter case, the position of said pivot axis relative to the running wheels can vary during operation.

The pivot axes can be disposed above the first and the second rotation axis as well as below the latter. When the running wheels enclose a receptacle space, the greater part thereof in the first case is thus situated primarily below the pivot axis, while being situated primarily above the pivot axis in the second case. The disposal of the pivot axis in the upper region of the vehicle enables a particularly positive stability in the first driving configuration.

In a first group of preferred embodiments the articulated mechanism is configured so as to be parallel kinematic. This enables a high degree of flexibility in terms of the operation and the utilization of the space between the vehicle parts, and a lightweight mechanical construction. Elements of the parallel kinematic can directly connect the two vehicle parts; for example, a rod can run between two joints which are in each case fixedly disposed on one of the vehicle parts. In this case, a suitable parallel kinematic can be constructed using 2×3 pneumatic cylinders, for example.

Elements of the parallel kinematic can also run in each case between one of the vehicle parts and a central element. This central element can be configured inter alia as a receptacle member. It is also possible for a plurality of central elements to be provided, wherein in each case the outermost of these elements is on both sides connected to the vehicle parts by way of elements of the parallel kinematic. A platform for receiving persons and/or goods can be fixed between these central elements, for example. All or some of the elements can be embodied as pneumatic cylinders, for example. The controls are in particular computer-based.

In a second group of preferred embodiments the articulated mechanism is configured so as to be serial kinematic. This enables simple controlling and a simple mechanical construction. The articulated mechanism can thus be constructed by way of a hinge (defining the pivot axis) and two pneumatic cylinders, for example.

The vehicle can comprise a support unit which is connected to the first and the second vehicle part and has at least one further ground contact face. The connection can take place directly to the corresponding vehicle part, or indirectly, for example by way of the fastening to the respective other vehicle part, this other vehicle part and the pivot mechanism. The support unit comprises in particular a further wheel for contacting the ground, in particular a passive wheel.

However, support units which comprise only a skid or a bearing plate and are used primarily with a view to the vehicle being stationary are also conceivable.

As is explained further below, the vehicle parts of the vehicle can be utilized and combined with one another in a modular manner in a multiplicity of specific applications. The invention therefore also relates to the individual vehicle parts (wheel modules). The latter comprise a running wheel rotatable about a rotation axis, a drive for the running wheel, and a connector element for an articulated mechanism. Said individual vehicle parts (wheel modules) can comprise further components, specifically drive components (for example electric motors).

A plurality of vehicles according to the invention can be combined for temporary or permanent use, as is likewise explained further below. A corresponding vehicle assembly thus comprises at least two vehicles according to the invention which are mechanically connected to one another, in particular in a releasable manner. The vehicles thus serve as a basic module, wherein a plurality of basic modules can be flexibly combined with one another. In the case of a permanent combination, this results in reduced production costs by virtue of the reduced number of different functional groups. The potential applications are expanded as a result of temporary combinations.

In one preferred variant the at least two vehicles are connected to one another by a connection part, wherein the connection part provides a receptacle space for loads to be received (goods and/or persons).

Further advantageous embodiments and combinations of features of the invention are derived from the detailed description hereunder and from the entirety of the patent claims.

BRIEF DESCRIPTION OF THE DRAWINGS

In the drawings used for explaining the exemplary embodiment.

In principle, identical parts are provided with the same reference signs in the figures.

EMBODIMENTS OF THE INVENTION

The device will be illustrated by the exemplary embodiments according to FIGS. 1 to 9. Only components relevant to the invention are symbolically illustrated. Electric, hydraulic and/or pneumatic connections are not illustrated. Solid thick lines relate to individual components while solid thin lines relate to auxiliary and indicative lines, dashed lines relate to invisible regions of relevant components, dotted lines relate to positions, upgrades, variants or modules, and chain-dotted lines relate to the coordinate system, rotation and symmetry axes, profiles of movements, multiple illustrations, and parallel kinematic devices.

The parallel kinematic devices 17 having the parallel kinematic platforms 18 are symbolically illustrated as chain-dotted lines with rectangular delimitation lines, the parallel kinematic linear devices are illustrated as chain-dotted lines, and the parallel kinematic joints 19 are illustrated by a circle.

Figure 1:
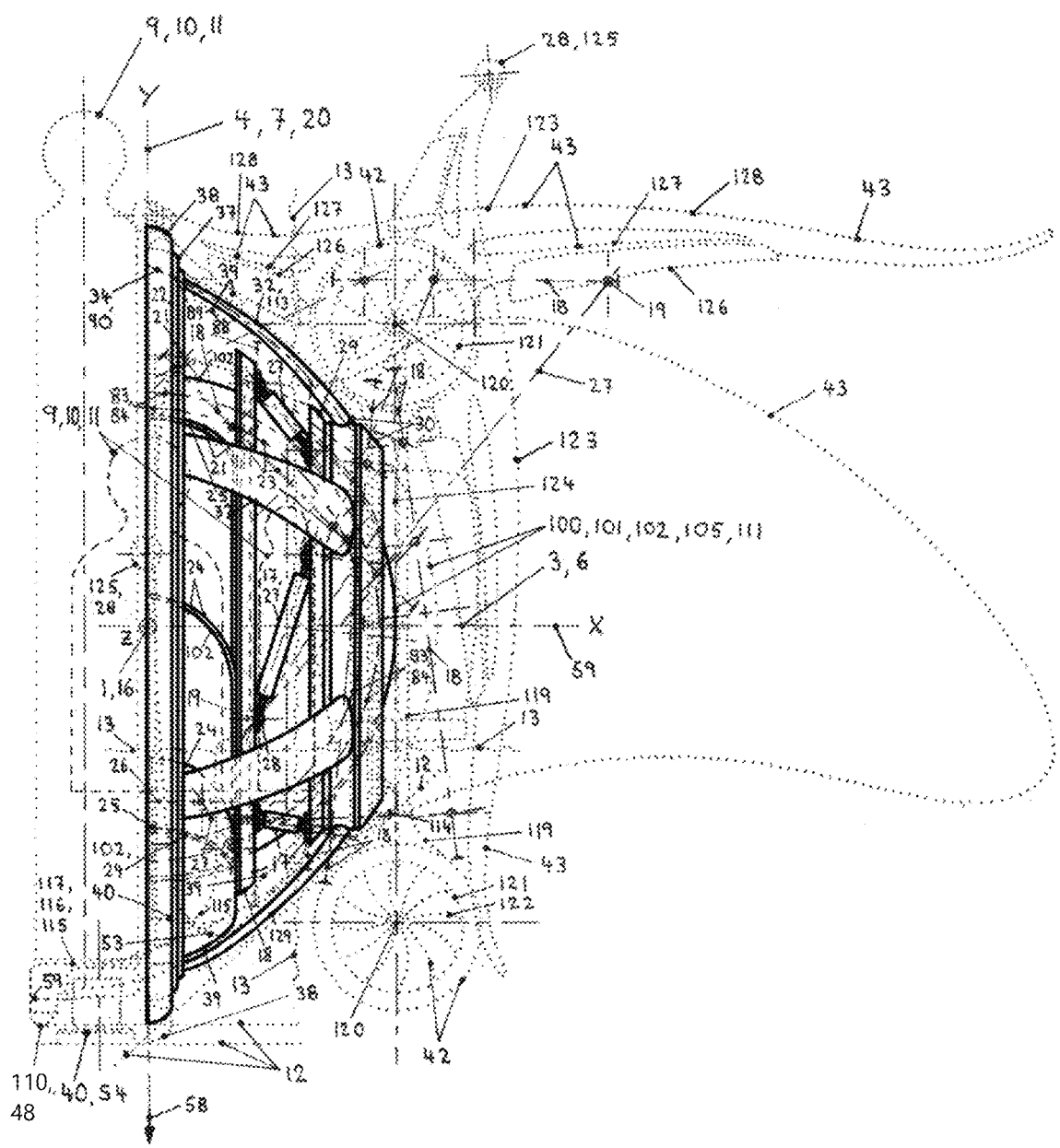
FIG. 1 shows a parallel kinematic base module having potential upgrade modules and applications in the I wheel angle position in a view from the front.

FIG. 1 illustrates a parallel kinematic base module 16 for conveying at least one person 9 and/or one object 10, hereunder also referred to as load member 11, having potential upgrade modules and applications in the I wheel angle position when viewed from the front. The Y-axis of the base module 16 corresponds to a symmetry axis 20. The stator connection device 21 is composed of two parallel kinematic devices 17 having in each case one inner and one outer annular parallel kinematic platform 18. The inner parallel kinematic platforms 18 are fixedly connected to one another by way of a stator spacer device 22, or kinematically connected to one another by way of at least one further stator pivot device 23. The stator spacer device 22 is composed of one or a plurality of fixed, spherical central stator spacer segments 24, and/or of one or a plurality of fixed, spherical door devices 25 and/or one or a plurality of door devices 25 pivotable about the global X-axis 3, and of one or a plurality of lateral stator spacer segments 24. The load member 11 by way of a load support device 26 and by way of linear kinematic devices 27 having ball joint closure devices 28 is on both sides connected to the inner parallel kinematic platforms 18. The outer parallel kinematic platforms 18 are on both sides connected in each case to one stator 29 of a bearingless torque motor 30 having a hollow shaft. The rotor connection device 31 is composed of fixed struts 32 and/or of rotor struts 35 which, dependent on or independent of the radial position of the wheel module 33, are connected so as to be pivotable about the rotor strut axis 34 and connect the rotor 36 to the wheel member 37 and the wheel tire 38. A plurality of energy storage devices 39 are connected so as to be centrally pivoted successively about the X-axis of the stator connection device 21.

A plurality of energy storage devices 39 in the form of a ground connection module 40 having a coupling device 52 and an extended energy storage foot device 53 for the purpose of tracking wind and the sun can be used with or without a ground connection device 54 as movable foot devices in flat or uneven terrain.

Illustrated as further applications in the form of upgrade modules is a device for conveying having a wheel module as a unicycle, a ground connection module 40 having an additional function as a tracker device 41, a plurality of thrust devices 42 and airfoil devices 43.

Figure 2:
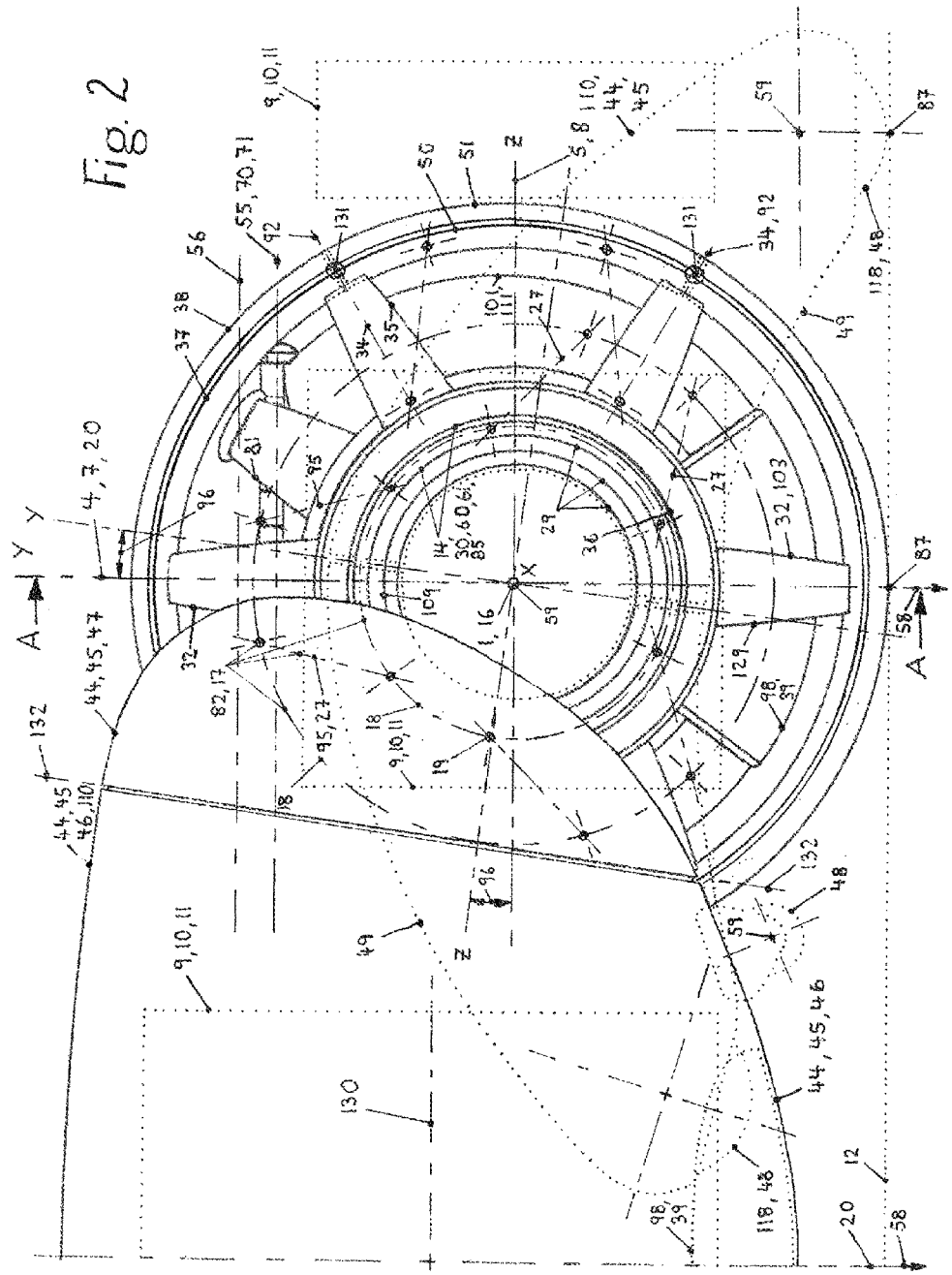
FIG. 2 shows two base modules of identical size which are connected in a serial kinematic manner and disposed in series behind one another in a lateral view.

FIG. 2 illustrates, through the symmetry axis 20, laterally in the I wheel angle position two base modules 16 which are connected in a serial kinematic manner and disposed behind one another in series and which have upgrade modules which by way of a base module connection device 44, also referred to as a base connection module 45 or a litter 46, by way of a kinematic aerodynamic connection shell 47 and a temporary auxiliary wheel 48 are connected in a parallel kinematic or an arbitrary manner. The energy storage devices 39 which are laterally connected so as to be pivotable about the local X-axes of the wheel modules 33 can be seen. A parallel kinematic connection device is symbolically illustrated in a lateral view. The litter 46 as an upgrade module, depending on the intended application, in the case of permanently opened wheel modules 33, so as to be central within the wheel modules 33, and/or by way of the external side of the base module 16, when using a hollow-shaft motor, within the stators 29, can be connected directly to the load member 11, or indirectly and/or laterally outside the wheel modules 33, by way of at least one stator 29, fixedly or immovably to at least one base module 16 in temporary manner, for example by way of quick-release couplings, or in a permanent manner. In the case of a temporary connection, the litter 46 by means of at least one auxiliary wheel 48 or an arbitrary ration device 14 can also be conveyed by only one base module 16. Two single-axis devices in the form of unicycle hitch devices 49 which are pivotable about the global X-axis 3 at the front and/or the rear and have in each case one auxiliary wheel 48 or an arbitrary rotation device 14 at the front and the rear are illustrated as further upgrade modules. The auxiliary wheels 48 are movably or fixedly connected to the base module 16 by way of the base module connection device 44, or connected directly to said base module 16. The ground 12 is contacted in each case by one auxiliary wheel 48 or by no auxiliary wheel 48. In order for the lateral inclination angle 97 to be controlled in a closed-loop manner, the litter 46 can have at least one energy storage devices 39 pivotable about the energy storage pivot axis 130. The wheel member 37 and the wheel tire 38 in this view are illustrated in the form of one of at least six wheel member segments 50 and wheel tire segments 51 having at least two linear kinematic devices 27 in the function as struts 32 per wheel tire segment 51. The connection between the wheel member segments 50 and the wheel tire segments 51, as well as the connection of the linear kinematic devices 27 to the rotor 36 and the wheel member segments 50 takes place by way of wheel member joints 131 having at least one degree of freedom. In the case of a corresponding mutual radial alignment of the wheel modules 33, the wheel member volume can be automatically reduced if required as a result. By correspondingly varying the linear positions of the linear kinematic devices in conjunction with the wheel member joints 131 with limited degrees of freedom, whereby the linear positions of the mutually opposite linear kinematic devices 27 are not identical. In the case of more than two linear kinematic devices 27, for example in the case of a parallel kinematic strut connection, the wheel member segments 50 can be mutually separated by way of quick-release couplings. A kinematic wheel member connection enables inter alia the application of an automatic retraction mechanism for the purpose of reducing the volume of the wheel members 37, an out-of-round wheel member geometry for the purpose of crawling in a manner similar to tracks in uneven terrain, or an automatic disassembly of the device.

Figure 3:
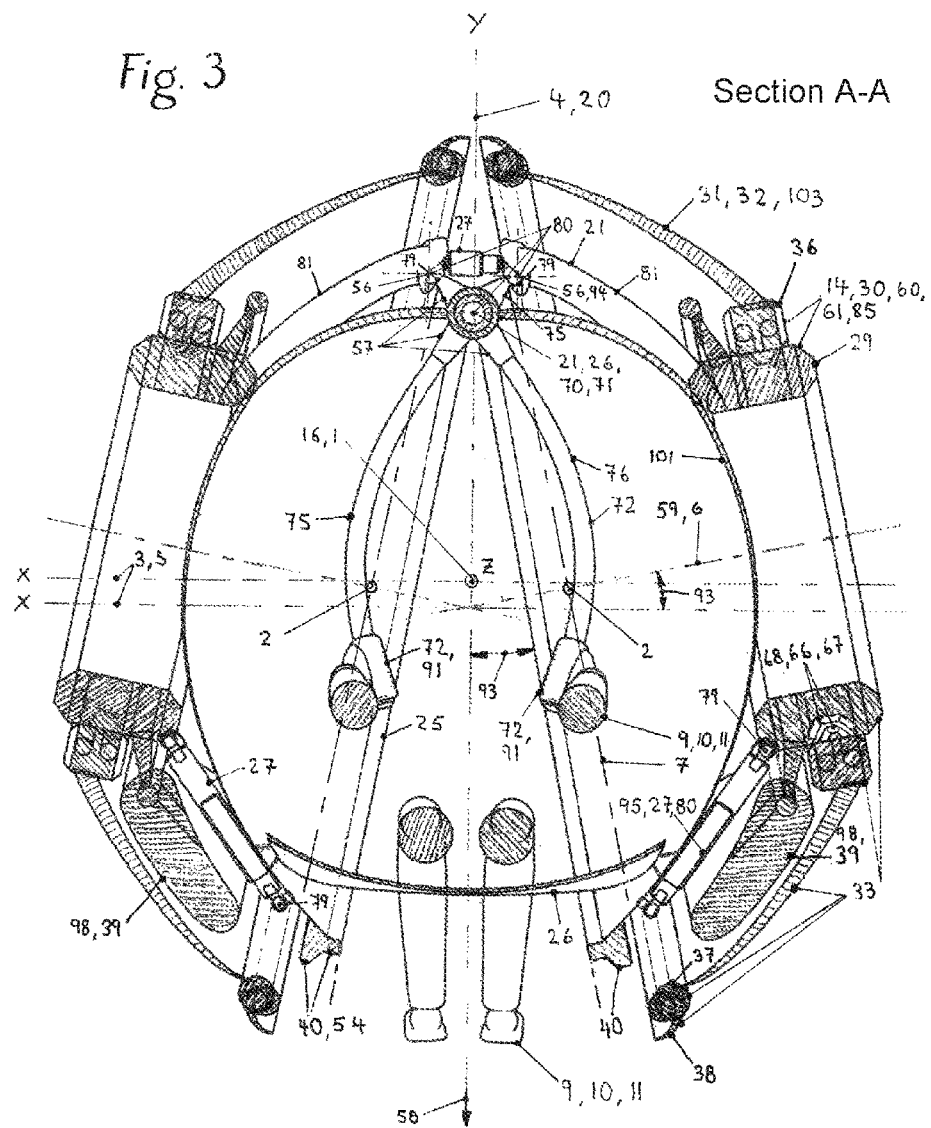
FIG. 3 shows a serial kinematic base module in a view from the rear.

FIG. 3 in a sectional view A-A illustrates in a view from the rear a serial kinematic base module 16 having lateral energy storage devices 39 which for conveying a person 9 are connected so as to be pivotable about the local X-axes of the wheel modules 33 in the A wheel angle position.

Figure 4:
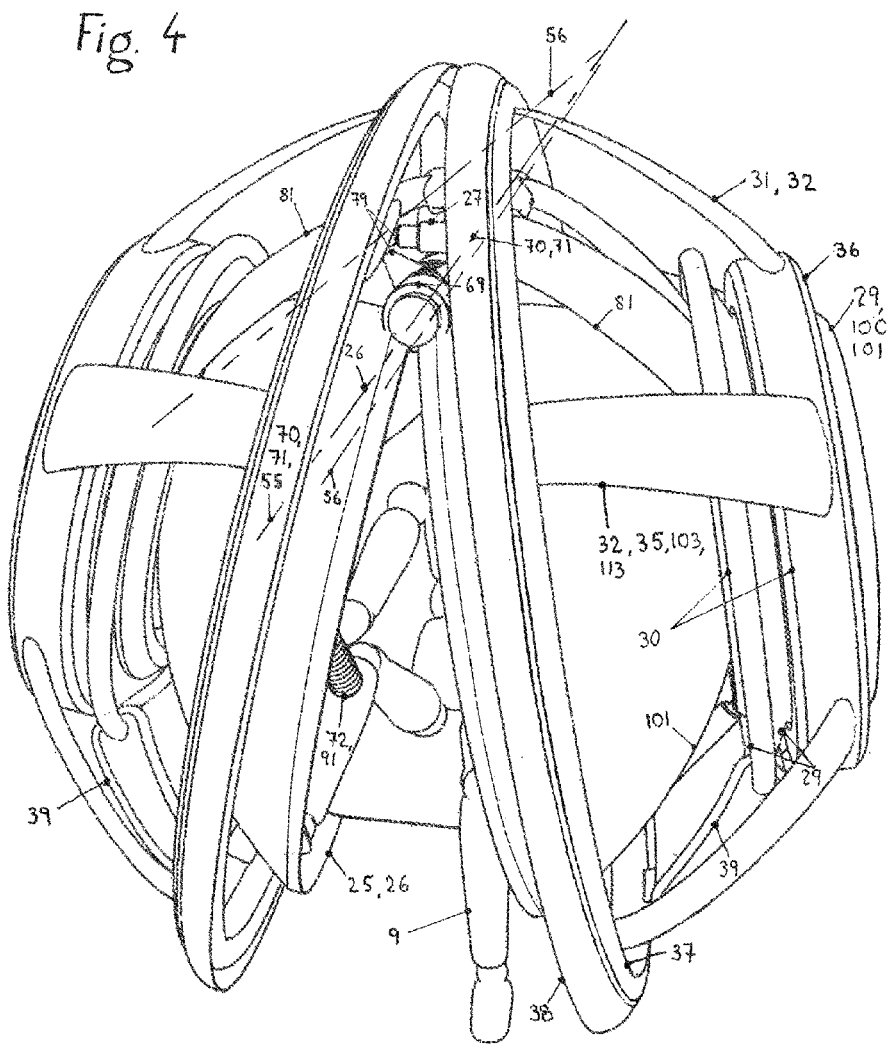
FIG. 4 shows a serial kinematic base model in a spatial lateral view from the front.

FIG. 4 illustrates a serial kinematic base module 16 for conveying a person 9 in space in a lateral view from the front.

Figure 5:
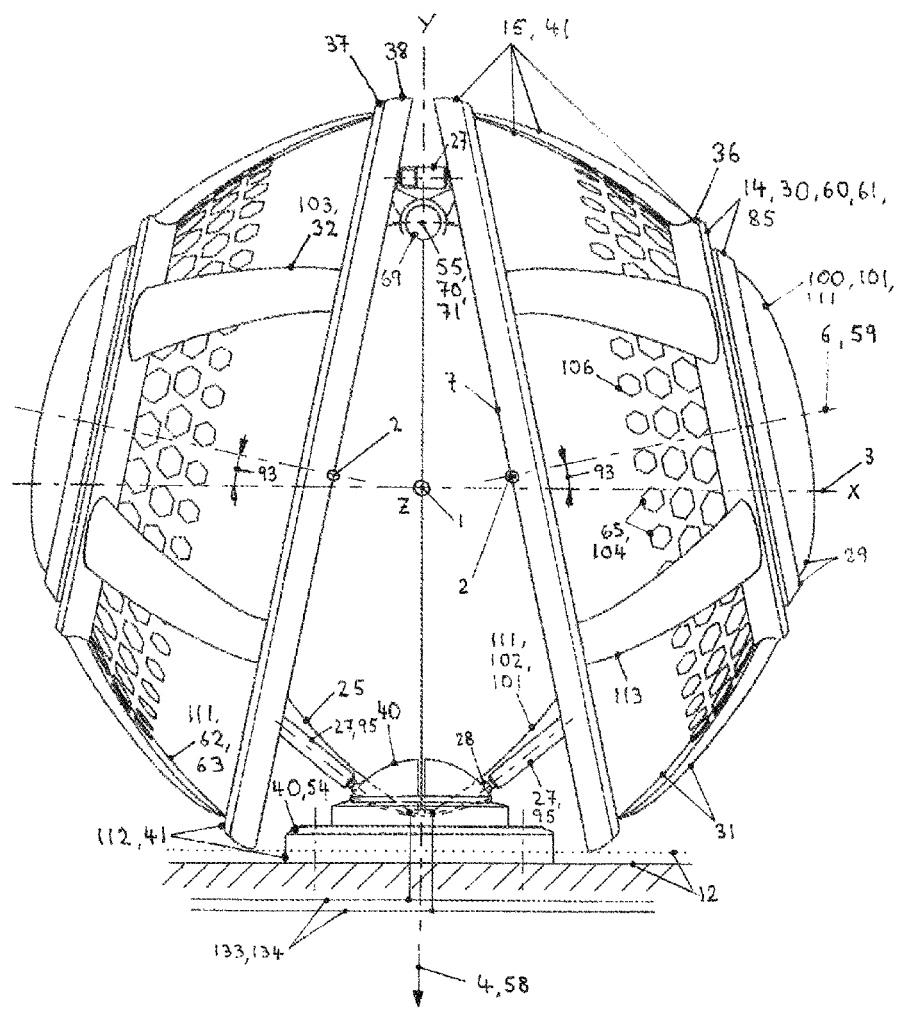
FIG. 5 shows a serial kinematic base module in the A wheel angle position in a view from the front.

FIG. 5 is a view from the front illustrating a serial kinematic base module 16 having a central ground connection device 54, having an additional function as a tracker device 41 for utilizing solar and wind energy in the A wheel angle position.

Figure 6:
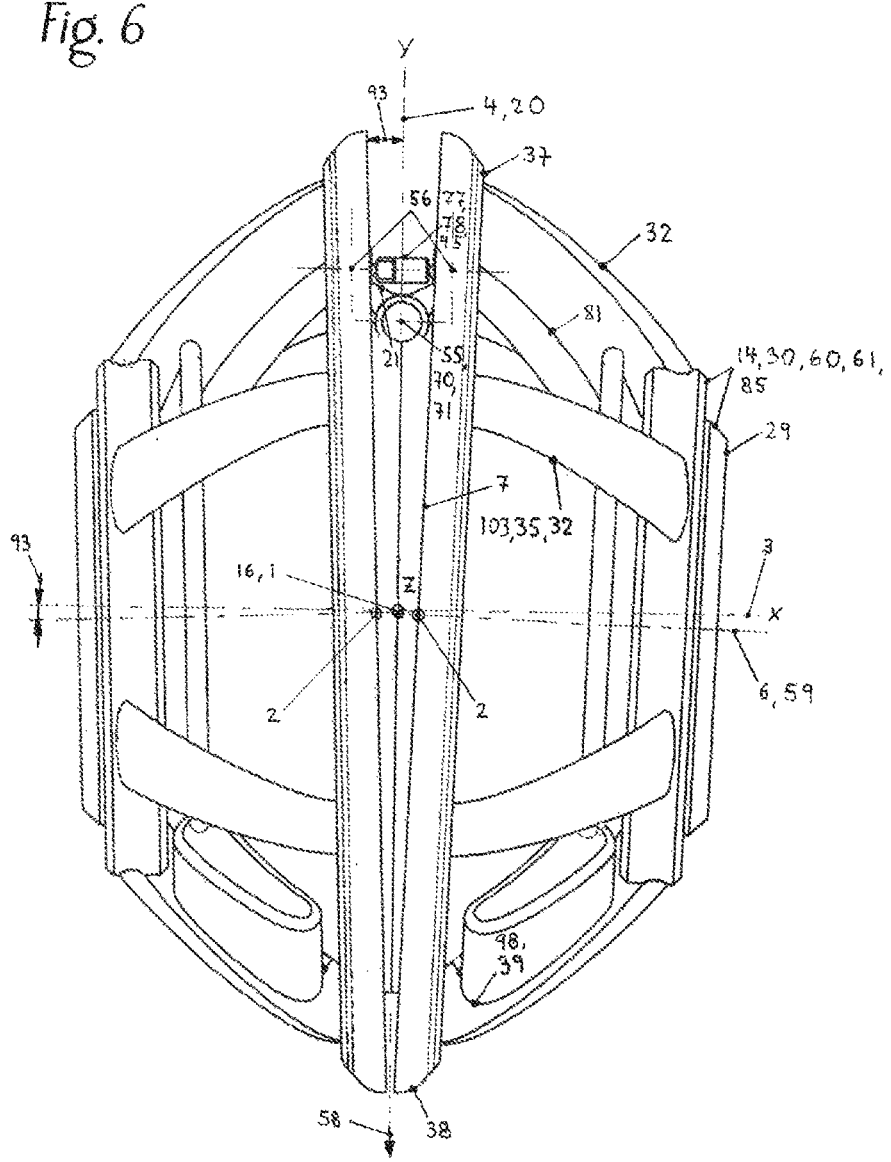
FIG. 6 shows a serial kinematic base module in the V wheel angle position in a view from the front.

FIG. 6 in a view from the front illustrates a serial kinematic base module 16 in the V wheel angle position.

Figure 7:
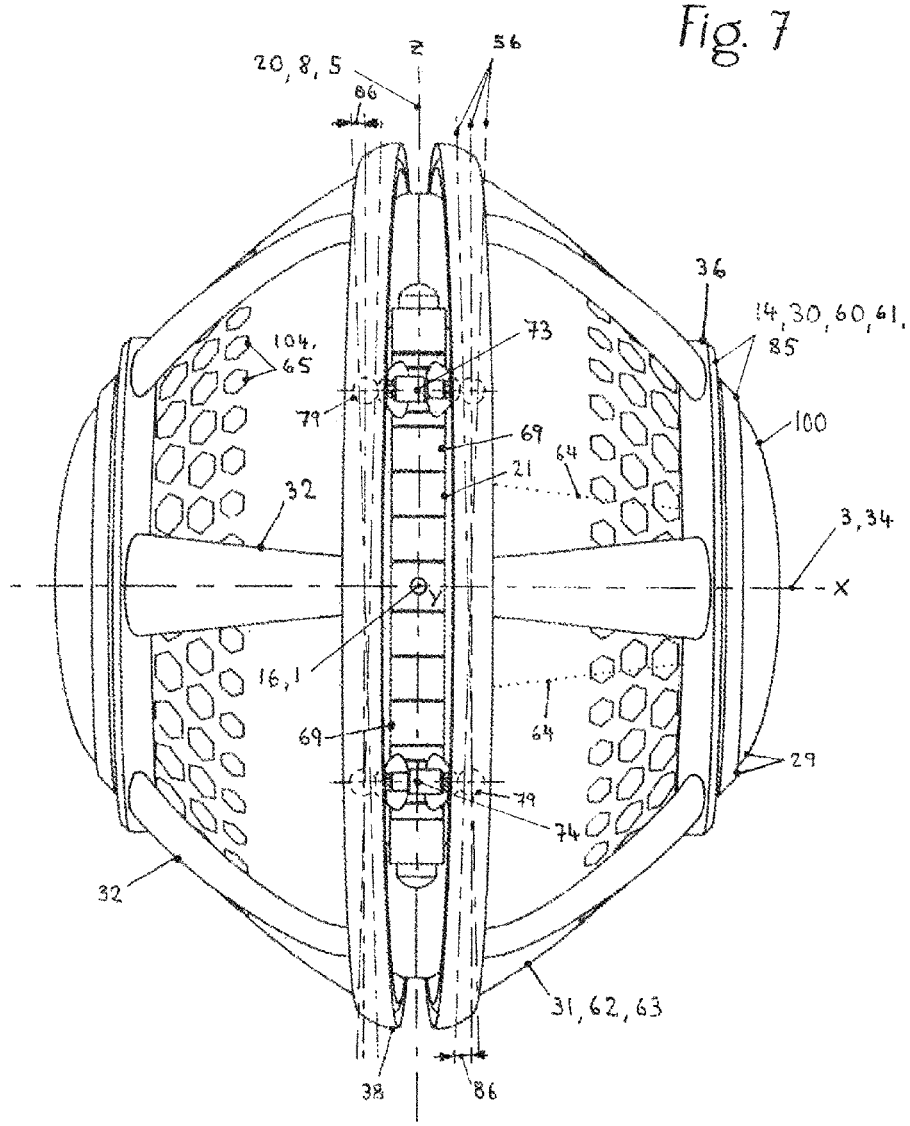
FIG. 7 shows a serial kinematic base module in the V wheel angle position in a view from above.

FIG. 7 in a view from above illustrates a serial kinematic base module 16 in the V wheel angle position, having a main connection axis 55 and two lateral connection axes 56 which in a parallel position of the wheel modules 33 run parallel to one another and during a transformation by a trailing method of one or both shear devices 57 run in opposite, not mutually parallel, directions.

Figure 8:
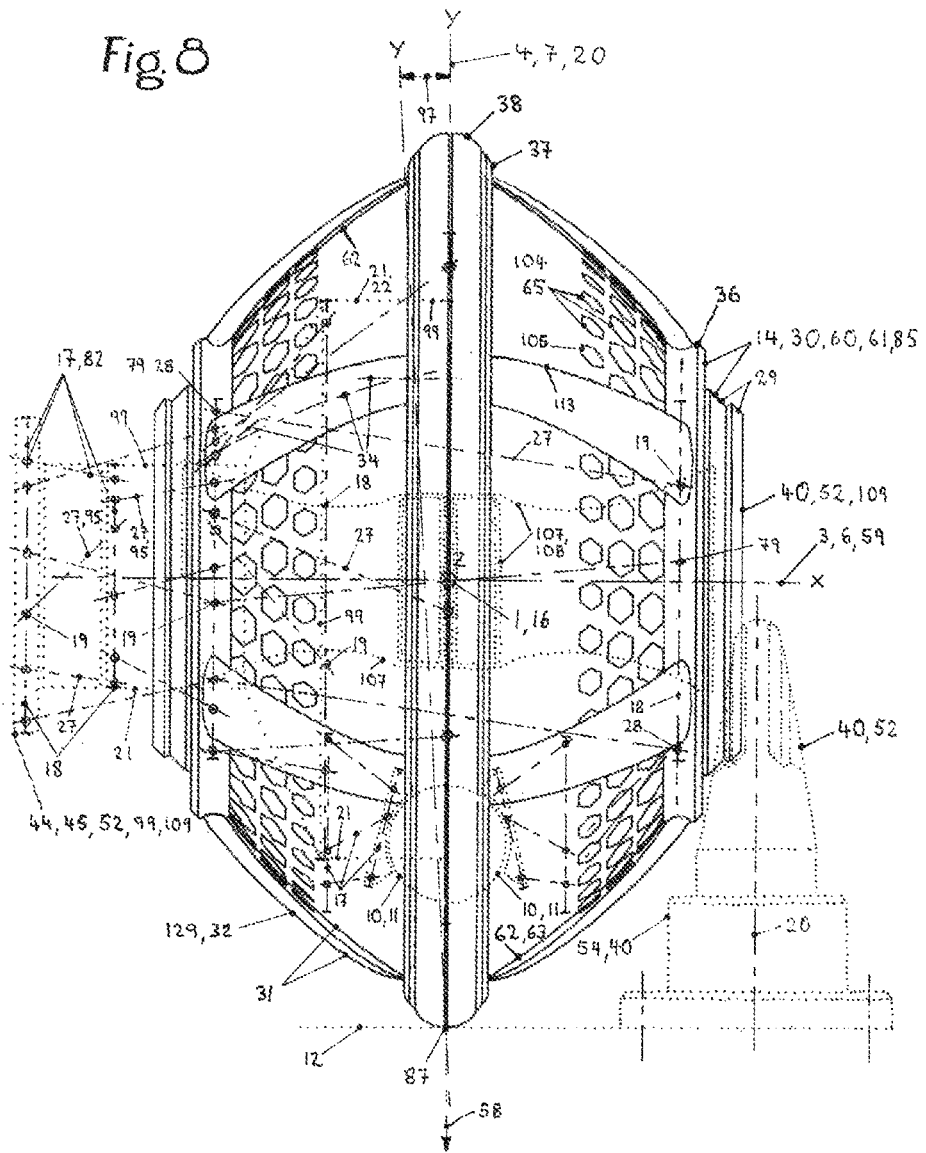
FIG. 8 shows any kinematic or parallel kinematic base module in the I wheel angle position from the front.

FIG. 8 is a view from the front illustrating an arbitrary kinematic or parallel kinematic base module 16 in the I wheel angle position. The figure symbolically shows a plurality of stacked and nested variants of disposing parallel kinematic devices 17 for operating the base module 16, as well as two parallel kinematic devices 17 having an operating radius of 360° about the global X-axis 3 for the purpose of carrying out an arbitrary operation. A laterally connected ground connection device 54 for connecting two base modules 16, with an additional function as a tracker device 41, is illustrated as an upgrade module. %

Figure 9:
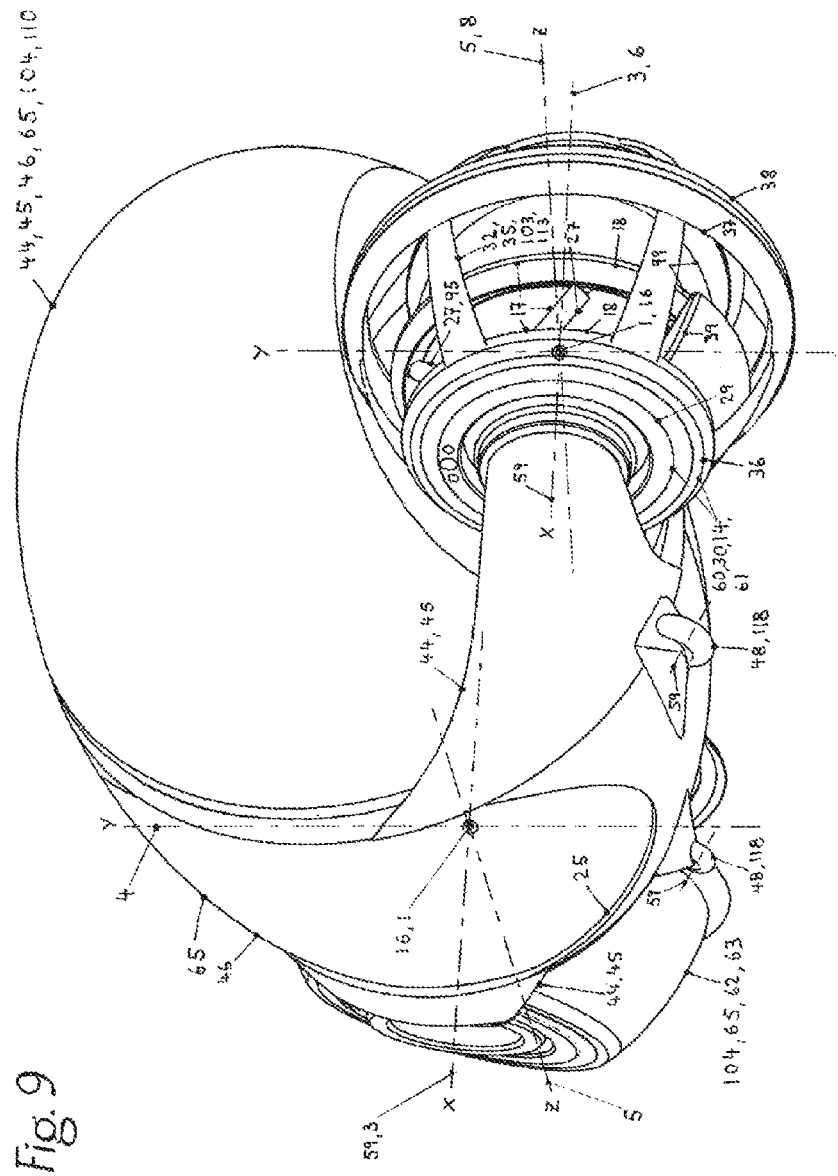
FIG. 9 shows two base modules of different sizes which are connected in parallel and disposed in series behind one another.

FIG. 9 illustrates a device having two parallel kinematic base modules 16 of different sizes having a litter 46. The litter 46 by way of stator-fixed connections 99 is connected directly to the inner parallel kinematic platform 18 of the base modules 46 by means of quick-release couplings and can be automatically docked or undocked and, by means of the auxiliary wheels 48 also be moved by only one base module 16. The terms and functions will be described hereunder.

Geometry

As opposed to a connection of two rotation devices 14 in series behind one another, for example in the case of a conventional bicycle or motorcycle having a steering geometry by way of a single driving track, the two rotation devices 14 in the present invention are disposed in parallel next to one another The global coordinate system 1 of the base module 16 in the angular reference position is defined by the X-axis as the rotation axis 59 of the rotation devices 14, by the Y-axis as the symmetry axis 20 and the vertical in relation to the force of gravity 58, and by the Z-axis as the conveying direction on the ground 12.

The local coordinate systems 2 of the rotation devices 14 in the angular reference position are defined by the X-axis as the rotation axis 59, by the Y-axis perpendicular to the rotation axis 59, and by the Z-axis as the conveying direction on the ground 12.

Construction/Function

The device is composed of at least one base module 16 having at least two active or passive rotation devices 14, hereunder also referred to as wheel modules 33, the stators 29 of the latter being connected directly and/or indirectly to one another by way of at least one arbitrary serial kinematic, parallel kinematic and/or arbitrary kinematic stator connection device 21.

In principle, the wheel modules 33 can be mechanically connected to one another from the outside and/or from the inside. A closed conveying system is created as a result of the wheel modules 33 being connected from the inside.

The stator connection device 21 can connect the stators 29 to one another directly and/or indirectly by way of at least one stator spacer device 22.

The stator connection device 21 can connect the stators 29 directly and/or indirectly to the load member 11 by way of an arbitrary stator spacer device 22 and/or load support device 26.

The stator spacer device 22 enables an access radius of the load member 11 to the base module 16 of 360° about the global X-axis, as well as an operating radius of 360° about the global X-axis 3 for carrying out an arbitrary operation of the load member 11 within and/or outside the base module 16. The load member 11 may be larger or smaller than the device.

Active Base Module/Drive Devices/Motors

An active base module 16 is composed of at least two active rotation devices 14. An active rotation device 14, hereunder also referred to as the motor 60 or the drive device 61, is composed of at least one stator 29 and at least one rotor 36 which by way of an arbitrary bearing device is actively driven directly or indirectly about the rotation axis 59.

The rotor 36 by way of an arbitrary rotor connection device 31, hereunder also referred to as struts 32, rotor struts 35, rotor shells 62, rotor full shells 63 or rotor shell segments 64, is connected to the wheel tire 38 and the ground 12 by way of the wheel member 37. The aforementioned conjointly form an active wheel module 33.

A base module 36 can also be composed of wheel modules 33 with out-of-round geometry of the wheel member 37, with wheel member segments 50, or without a wheel member 37.

Active rotation devices 14 can be composed of simple drive systems such as bearingless electric, hydraulic or pneumatic torque motors 30 having a hollow shaft as the stator 29, supplied by mains-operated energy storage devices 39 having an energy recovery system, and/or of hybrid drive systems combined, for example, with a manual full-body drive, and/or of multi hybrid drive systems which for the local harvesting of energy additionally utilize solar and/or wind energy by way of energy conversion devices 65.

Torque Motor

In the present exemplary applications, directly driven, bearingless torque motors 30, or torque motors 30 mounted in an arbitrary manner, having a hollow shaft in the form of external rotor motors are used. When using an electric bearingless torque motor 30, the stator 29 is connected to the rotor 36 by way of a contactless magnetic bearing device 66 having permanent-magnetic and/or electro-magnetic actuators 67. The motors 60 can be watertight and/or water resistant and electrically shielded. The actuators 67 in the function as the drive device 61 and as the bearing device 68 are disposed in parallel in an annular manner and at an angle of 45° about the local X-axis. The energy impulses from the stator 29 to the rotor 36 in the case of a positive acceleration, and from the rotor 36 to the stator 29 in the case of a negative acceleration, for the purpose of energy recovery can be transmitted in the form of an electrical impulse transmission to the actuators 67 at a ratio of 1:1, without gearing, up to a corresponding integer divisor of the actuators at a ratio of 1/X at maximum gearing. A hollow shaft enables inter alia an arbitrary mechanical connection between an arbitrary device on the side of a base module 16 within the stator 29 and the load support device 26, the inner parallel kinematic platform 18 and/or directly the load member 11. In the case of a corresponding diameter of the wheel module 33, lateral access by the load member 11 or by persons 9 to the load support device 26 is possible.

Manual Full-Body Drive

A manual full-body drive is possible inter alia in the form of a stationary running device which directly or indirectly positively gears the energy of the biomechanical running cycle of arms and legs in natural movements during walking and/or running, while transmitting said energy to the drive devices. The full-body drive can be composed of four parallel kinematic hydraulic and/or pneumatic drive devices for arms and legs which are connected to the stator connection device 21 and, by means of a hydraulic distributor system, by way of various radial positions transmit energy to the hydraulic or pneumatic torque motors 30 in a direct, positively geared and/or negatively geared manner. In the case of hydraulic or pneumatic torque motors 30, the drive can be upgraded to a hybrid drive by an additional central drive device in the form of a hydraulic or pneumatic pump device. The differential distribution of the volume of oil or air to the torque motors 30 by way of a corresponding valve technology enables precise steering and driving of the device as well as energy to be recovered from the latter. The three degrees of freedom of the parallel kinematic platforms enable the base module 16 to be intuitively as well as manually driven using corresponding hydraulic and/or electric closed-loop valve control and/or amplification technology without further electronic controls, and the transformation process to be controlled as well as to be steered.

Passive Base Module

A passive base module is composed of at least two passive rotation devices. A passive rotation device is composed of at least one static part and one part which is connected by way of an arbitrary bearing device and rotates about the rotation axis 59.

Passive rotation devices can be driven over the ground 12 by arbitrary drive devices, for example, as in an application in combination with a further device according to the invention, or in the case of an application as a front wheel device in a conventional motorcycle having rotation devices which are disposed in series behind one another.

Serial Kinematic Stator Connection Device

In a base module 16 having at least one serial kinematic stator connection device 21, illustrated in FIGS. 2, 3, 4, 5, 6 and 7, the two wheel modules 33 are hierarchically connected to the stator connection device 21.

A base module 16 having a serial kinematic stator connection 21 is also referred to as a serial kinematic base module 16. A serial kinematic base module 16 can be composed of one, two, three or a plurality of stacked and/or nested serial kinematic devices.

The load member 11 by way of the load support device 26 in the form of a suspension device is fixedly connected to the main connection shaft 70 on the main connection axis 71, or kinematically connected to the latter by way of a hinge device 69. A front shear device 73, extended in length as a control lever 72, and a rear shear device 74, having in each case at least one left shear leg 75 and one right shear leg 76, by way of a joint device having at least one degree of freedom, connect the two lateral connection axes 56 to the main connection axis 55.

The main connection axis 55 forms the rotation point of the shear legs 76. Both lateral connection axes 56 of the shear devices 74 by way of in each case one linear kinematic device 27, hereunder also referred to as a cylinder device 77, with an additional function as a shock absorber 78, are directly connected to one another by way of ball joints 79.

Each wheel module 33 is connected to the load support device 26 so as to be pivotable about the lateral connection axes 56 by way of an upper serial kinematic connection device 80, and connected to said load support device 26 by way of a lower linear kinematic device 27. This geometric arrangement of a wheel module 33 corresponds to a three-point connection.

Each stator 29 is connected directly to the load support device 26 or to the latter by way of at least one stator strut 81 so as to be pivotable about the lateral connection axis 56 by means of ball joints 79.

Parallel Kinematic Stator Connection Device

In a base module 16 having at least one parallel kinematic stator connection device 21 the stators 29 are connected directly to one another by way of at least one parallel kinematic device and/or by way of an arbitrary stator connection device 21.

A base module 16 having a parallel kinematic stator connection device 21 as is symbolically illustrated in FIGS. 1, 2 and 8, hereunder is also referred to as a parallel kinematic base module 16. As is illustrated in FIG. 8, a parallel kinematic base module 16 for carrying out an arbitrary operation can be composed of, for example, one, two, three or a plurality of stacked parallel kinematic, as the stator connection device 21, and of at least one nested parallel kinematic devices 17.

The parallel kinematic device is composed of at least two parallel kinematic platforms 18 which by way of at least three arbitrary kinematic devices, such as linear kinematic devices 27, are connected to one another by way of arbitrary joint connections such as ball joint closure devices 28. The linear kinematic devices 27 can be composed of, for example, linear electric, hydraulic and/or pneumatic kinematic devices. In the case of a hexapod 82, the parallel kinematic device 17 is composed of six linear kinematic devices 27.

In the present parallel kinematic exemplary application in FIG. 1, a parallel kinematic base module 16 having two parallel kinematic devices 17 is illustrated. The two inner parallel kinematic platforms 18 are fixedly connected to the stator connection device 21 and correspond to the global Y-axis. An additional pivot device 83, hereunder also referred to as a platform pivot device 84, in at least one degree of freedom enables a variable angle between the two inner parallel kinematic platforms 18.

The parallel kinematic platforms 18 are connected to the linear kinematic devices 27 by way of ball joint closure device 28 with a plurality of degrees of freedom. Here, at least one of the parallel kinematic platforms 18 on each side is connected directly to at least one rotation device 14 or connected indirectly to the latter by way of at least one stator 29. The coordinate system of the outer parallel kinematic platform 18 can correspond to the local coordinate system of the rotation device 14.

The parallel kinematic base module 16 hereunder serves as the reference device of the description.

Modular Nesting/Mechanical Interlinking

The device, depending on the application, can be upgraded using arbitrary modules that are larger and/or smaller than the base module 16. The wheel modules 33 and the stator connection devices 21, depending on the application, can be composed of in each case one module or of a plurality of modules which are nested in an arbitrary manner, and/or stacked, linked and/or interlinked in an arbitrary two-dimensional or three-dimensional manner having arbitrary serial and/or parallel kinematic connections for the purpose of combining the most varied functions in the tightest space. The principle of nesting and/or stacking of interlinked modules is comparable to the construction of a molecular structure. One or a plurality of base modules 16 can be connected in an arbitrary manual and/or automatic manner to identical or arbitrary upgrade modules and/or arbitrary devices within or outside the base module 16. The device can also be composed of one or a plurality of identical and/or different stator connection devices 21.

Conveyance/Braking Method on the Ground/Energy Recovery

The conveyance of a base module 16 on the ground 12 takes place by positive or negative acceleration or at a constant speed of the drive devices 61. In the case of rectilinear conveying, the speeds of the drive devices are identical. In the case of a change of direction, the speeds may vary in differential manner. The differential conveyance method can be a component part of the steering method.

The negative acceleration of the device in the form of a braking method can take place, for example, by brake devices by means of mechanical hydraulic disk brakes and/or by energy recovery systems by means of the motors 60, the latter functioning as generators 85.

Steering Method Having Contactless Wheel Members or Wheel Members Connected in a Sliding Manner For tracking and changing direction the device enables a plurality of different methods for steering the base module 16 when conveying on the ground 12. Depending on the application, one or a plurality of steering methods can be used in combination as the steering method.

In a wheel angle position without any connection of the two wheel tires 38, wheel members 37 and/or wheel modules 33, and/or a punctiform or a planar sliding connection therebetween, the steering method can be performed by one or a plurality of the following steering methods.

The steering method as a component part of the acceleration method and of the braking method by way of differential acceleration values of the two wheel modules can be performed mechanically, hydraulically, pneumatically and/or electrically by way of the steering device, and/or electronically in the form of positive, negative or zero acceleration. The braking methods by negative acceleration can be energy-recovering and/or mechanical braking methods. The inertia of the steering method is a function of the gyroscopic effect resulting from the rotational speed as well as of the wheel angle position, the latter influencing the leverage of the wheel modules 33 about the global Y-axis 4.

In the case of a parallel kinematic base module 16, or in the case of a base module 16 having a corresponding serial kinematic geometry, the steering method can be performed by pivoting the wheel modules 33 about the local Y-axes, accompanied by a corresponding correction of tracking. When correcting the tracking, the local X-axes are no longer situated at the same height level. The two wheel modules 33 along the global Z-axis are offset behind one another at different local Y-angles, this resulting in a steering-geometry driving track.

This steering method as well as the transformation method of the base module 16 is comparable to changing tracks when ski-ing. The longitudinal axes of the two skis here correspond to the local Z-axes of the wheel modules 33 and thus to the conveying direction in the case of a parallel Y-position of the wheel modules 33. In the case of a parallel Y-position of the wheel modules 33, the trailing angle 86 corresponds to 0°. The ground contact of the skis corresponds to the ground contact points 87 of the wheel tires 38. The transformation method can take place continuously on the ground or by abrupt steps.

Steering Method with Fixedly Connected Wheel Members

In the case of a wheel angle position having a fixed, planar connection between the two wheel tires 38, the wheel members and/or the wheel modules 33, such as in the I wheel angle position as a water-tight base module 16, for example, or in the V wheel angle position, the steering method can be performed by one or a plurality of the following methods.

The steering method can be performed by arbitrary gyroscopic devices, by changing the position of the energy storage segments 88 as eccentric devices 89 for utilizing the centrifugal and the centripetal forces which, as a function of the radial position of the wheel module 33, along the eccentric profile axis 90 are kinematically connected to the struts 32, or by means of manual and/or kinematic impact force impulses and/or tensile force impulses of the energy storage devices 39, which are laterally connected to the stator 29 so as to be pivotable about the local X-axis 6, act on the lever of the global X-axis 3 about the global Y-axis 4 and/or on the shear device control lever 91 about the global Y-axis 4.

When conveying by way of a tight closed base module 16, and/or by way of a tight stator connection device 21 and an arbitrary open base module 16 within a medium such as, for example, water and/or while floating on the water in the position with a vertical global Y-axis 4 and a low center of gravity, the steering method can be performed by a differential variation of the radial strut positions of the wheel modules 33 about the strut longitudinal axis 92.

Steering methods having fixedly connected wheel modules 33 can also be applied in the case of loose wheel modules.

In the case of at least one further wheel module 33 disposed in series, the steering method can be performed by a conventional steering geometry with a driving track.

Transformation/Trailing Method/Wheel Angle

The trailing method is the subject matter of the present invention and describes the transformation process of the device for the purpose of changing the shape, the function and the properties of the device while travelling. In the present exemplary applications in FIGS. 1 and 3 to 7 the transformation of the base module 16 takes place from a parallel bicycle to a unicycle, and/or from a unicycle to a parallel bicycle. In FIG. 2, the transformation takes place in a synchronized transformation of two base modules 16 having a base module connection device 44 from a conventional quad to a conventional bicycle, and/or from a conventional bicycle to a conventional quad. In the transformation of only one base module 16, the transformation takes place from a tricycle to a bicycle, and/or from a bicycle to a tricycle.

The wheel angle 93 having the wheel angle rotation point 94 describes the angle and the position of the local Y-axes 7 of the wheel modules 33 in relation to the global Y-axis 4 and/or in relation to the force of gravity 58. The wheel angle rotation point 94 in the case of a serial kinematic connection can be a lateral connection axis 56. In the case of a parallel kinematic connection, the wheel angle rotation point 94 can be the zero point 2 of the local coordinate system of the wheel module 33, or an arbitrary position of the parallel kinematic operating range. The wheel angle 93 while travelling can vary by changing the trailing angle 86, the theoretical angle and the position of the local Z-axes 8 of the wheel modules 33 in relation to the global Z-axis 5, and for the purpose of transformation, for example from a bicycle to a unicycle, be influenced, for example, by a manual kinematic passive trailing method on the ground 12, and/or by an active trailing method by means of an arbitrary kinematic automated device which simulates a dependent movement algorithm which is proportional to the conveying speed.

The transformation takes place as a result of a slight lack of mutual parallelism between the wheel modules 33 and the Y-axes thereof by means of the parallel and/or serial kinematics of the stator connection device 21. In the case of a serial kinematic connection, the front and/or the rear angle of the shear devices 57 is changed. The lower linear kinematic device 27 here determines the mutual spacing of the wheel modules 33 and, as a function of the conveying speed, determines the duration of the transformation. In the case of a parallel kinematic connection, the outer parallel kinematic platforms are correspondingly positioned. A brief trailing method which consequently increases or decreases the track results from the conveying on the ground 12.

While travelling, the rotation devices 14 as a result of the trailing method can contact one another in a punctiform tangential manner, and in the case of a rotor connection device 31 curved in the direction of the global zero point 1 contact one another in a planar or a punctiform tangential manner, and/or by way of an arbitrary connection device be connected to one another in a temporarily fixed and/or dynamic manner.

Serial Kinematic Trailing Method

In a serial kinematic trailing method for the purpose of changing the wheel angle 93, the wheel modules in the trailing method move passively about the local Y-axes 7.

When using a hydraulic cylinder 95 as the lower linear kinematic device 27, the flow of oil is released by a valve technology and the trailing method is thus enabled. The flow of oil is stopped upon reaching the target wheel angle.

Parallel Kinematic Trailing Method

The trailing method in the serial kinematic stator connection device 21 can also be applied in a parallel kinematic stator connection device 21, for example in the case of hydraulic, manually controlled parallel kinematics, by closed-group control technology in the case of hydraulic valves with cam control, or electronically by means of corresponding algorithms.

Reference Positions Wheel Angle/Gyroscopic Effect/Self-Stabilizing

The device by way of the transformation method can assume geometrically different reference angle positions as well as arbitrary positions within the kinematic operating range. As a result, different positions and angular positions of the wheel modules 33 in relation to the global Y-axis 4 are possible. The reference angle positions of the geometric arrangement of the wheel modules 33 in the case of identical wheel angles 93 are referred to hereunder as wheel angle positions.

The point in time of a transformation is inter alia a function of the intensity of the gyroscopic effect, also referred to as the twirl effect. The gyroscopic effect describes the self-stabilizing of the mass of the device rotating about the local X-axis 6. The intensity of the effect is inter alia a function of the rotating speed of the wheel modules 33 and of the radial distribution of the mass. The arrangement of the mass, for example in the form of energy storage units and/or energy storage segments 88, in the present device can be changed during the rotation of the wheel modules.

The A wheel angle position represents the base module 16 having a positive wheel angle 93 as a bicycle while standing upright or when travelling relatively slowly up to the speed at which the device self-stabilizes.

The H wheel angle position represents the base module 16 having a wheel angle 93 of zero degrees when standing upright or when travelling relatively slowly up to the speed at which the device self-stabilizes. The H wheel angle position corresponds to a position of the wheel modules 33 as a base module 16 having local X-axes 6 running parallel to the ground that is opened by a distance between the wheel modules 33. The local Y-axes 7 run perpendicularly to the ground and correspond to the force of gravity. The local Z-axes 8 and local Y-axes 7 run so as to be mutually parallel. The local X-axes 6 correspond to the global X-axis 3 of the base module 16.

The V wheel angle position represents the base module 16 having a negative wheel angle 93 as a differentially steerable bicycle while the wheel modules 33 are not fixedly connected, or in the case of a fixed punctiform connection of the wheel modules 33, having the conveying properties of a unicycle, as from a speed at which the device self-stabilizes.

The I wheel angle position represents the base module 16 having a wheel angle position 93 of 0° as a differentially steerable bicycle while the wheel modules 33 are not fixedly connected, or in the case of a fixed planar connection of the wheel modules 33, having the conveying properties of a unicycle, as from a speed at which the device self-stabilizes. A planar fixed connection of the wheel modules 33 corresponds to a closed base module 16. The connection can be used for mutually separating a plurality of media. In the case of the I wheel angle position, the local Y-axes 7 and Z-axes 8 of the wheel modules 33 may be identical, depending on the construction mode of the base module 16 and the shape of the wheel tire 38.

The T wheel angle position in FIG. 1, besides a V wheel angle position, symbolically represents a parallel kinematic position of a wheel module 33 having a wheel angle 93 of 90° of the stator connection device 21 standing upright or rolling on the ground 12. The wheel angle position of at least 90° can be applied inter alia when using the wheel modules 33 as a horizontal rotation device 14 during vertical and/or horizontal travel in the air in the form of a two-rotor helicopter device and/or as a solar tracking device.

The wheel angles 93, without any influence of lateral forces in the direction of the global X-axis 3, can be identical in the case of rectilinear conveying. In the case of rectilinear conveying on an incline, when conveying by way of changing direction, as well as under the influence of lateral forces, for example in the form of side wind, the wheel angles 93 can have different values.

The device can also assume wheel angle positions between the reference angle positions described. One application does not have two be able to assume all wheel angle positions mentioned. The transition of the wheel angle positions and the transformation method, as a function of the conveying speed, can be performed in a stepless manner on the ground 12 and/or in steps by briefly lifting one wheel module side, for example by algorithmically balancing the parallel kinematic devices. The angles of the reference angle positions depend on the application.

Longitudinal Inclination Angle/Lateral Inclination Angle

The longitudinal inclination angle 96 and the lateral inclination angle 97 determine the angular position of the load member 11 in relation to the global coordinate system 1 of the base module 16 and/or the position of the global coordinate system 1 in relation to the force of gravity 58.

The longitudinal inclination angle 96 can be influenced by pivoting mass-rich devices such as energy storage devices 39, depending on the application the load support devices 26 and/or the load member 11, by one or a plurality of degrees of freedom. The longitudinal inclination angle relates at least to the global Z-axis of the device in relation to the force of gravity. The influence of the longitudinal inclination angle 96 on the device can have an effect inter alia in a positive or negative acceleration method, when levelling the load member, as well as when performing an arbitrary operation.

The lateral inclination angle 97 corresponds to the global Y-axis 4 of the device in relation to the force of gravity 58. The lateral inclination angle 97 can be the result of the two wheel angles 93 of the base module 16 and/or of weight shifting in a curve. The wheel angles 93 can have different values at a lateral inclination angle 97 of more or less than zero. The lateral inclination angle 97 in a parallel kinematic stator connection device 21 can be influenced in all degrees of freedom, and in a serial kinematic stator connection device 21 be influenced in the corresponding degrees of freedom by different wheel angles 93.

The longitudinal inclination angle 96, the lateral inclination angle 97 and the wheel angles 93 can have positive or negative values.

Controlling and Levelling by Kinematic Energy Storage Devices

The device can inter alia be controlled and levelled as a result of displacing mass of arbitrary components in an impulsive or constant manner. This may be the case inter alia in a fixed connection of the wheel modules 33. The motors 60 are supplied by one or a plurality of arbitrary mass-rich energy storage devices 39. One or a plurality of energy storage devices 39 can be connected to the rotors 36 and/or the stators 29 of the wheel modules 33 and/or to the stator connection device 21 so as to be successively pivotable in an arbitrary kinematic manner and/or beside one another about the local and/or global X-axes.

The energy storage devices 39 at one or a plurality of positions can be connected to the stators 29 and/or the rotors 36 of the base module 16 or arbitrary modules, such as base module connection installations 44 or litters 46, in a fixed or an arbitrary kinematic manner. As a result, gyroscopic, centrifugal and/or centripetal effects, for example as a result of the eccentric displacement of mass on rotating parts of the device, influencing the longitudinal inclination angle 96 and/or the lateral inclination angle 97, and/or by moving rotating parts of the device, can be utilized for the purpose of a force acting on the base module 16.

These arrangements can be used, for example, in the function as a steering method, transformation method, arbitrary control methods, and/or for performing an arbitrary operation.

Energy Storage Devices

The energy storage devices 39 for storing electric energy in electric drive devices 61 can be composed of accumulators 98. In hydraulic or hybrid drive devices 61, the energy storage devices 39 can be composed in the form of a hybrid storage system of one or a plurality of hydraulic spring pressure storage units, for example for recovering energy of the braking energy.

The energy storage devices 39 in the present applications are connected directly and/or indirectly to the rotor 36 as well as to the stator 29 of the wheel module 33 and/or to the stator connection device 21. In a parallel kinematic base module 16, the energy storage devices can be connected to the inner and/or outer parallel kinematic platforms 18. The energy storage device 39 can be one or a plurality of energy storage segments 88.

Stator Connection Device

The stator connection device 21 can be composed of one or a plurality of parts. One part can be composed of the load support device 26 that connects the stator connection device to the load member 11. The stator connection device 21 may correspond to the load support device 26 as well as to the load member 11.

Load Support Device/Nesting of Shells

The load member 11 by way of the load support device 26 can be fixedly connected to the stator connection device 21 in the form of an inner and an outer load support device 26, and/or for example be kinematically connected to the latter by way of at least one degree of freedom. This is possible, for example, in one or a plurality of degrees of freedom for the purpose of radially levelling the lateral balance in the case of a plurality of persons 9 about the global Y-axis 4, for the purpose of inclining the load member 11, for the purpose of an uprighting method, and/or for the purpose of performing an arbitrary operation, for example in the case of a rotation of the load support device 26 by 180° about the global Y-axis 4 for the purpose of reversing the conveying direction without rotating the device. As a result, the device can travel in both directions of the global Z-axis 5 while rolling on the ground 12.

An exemplary application having a spherical, transparent and in regions partially transparent load support device 26, composed of a plurality of spherical segments with different functions, is illustrated in FIG. 1. The spherical segments are composed of stator connection devices 21 in the form of a stator fixed connection 99, door devices 25 and lateral window devices 100.

The outer as well as the inner load support devices 26 can be connected to one another by way of connection devices nested in an arbitrary manner, such as simple or nested rotor full shells 63 or rotor shell segments 64 for the purpose of performing an arbitrary operation and/or for the purpose of separating, converting and/or cleaning different media, pressure states and/or temperature states.

Rotor Connection Devices

At least two rotors 36 of two rotation devices 14 of the base module 16 can in each case be connected directly, and/or indirectly by way of arbitrary rotor connection devices 31, such as fixed and/or dynamic rotor struts 35, rotor full shells 63, rotor full shells 63 having concavities for kinematic rotor struts 35, rotor shell segment 64, dynamic devices, covered cloth devices, and/or arbitrary kinematic devices, to the wheel members 37 and wheel tires 38. The zero point of the local Y-axis 7 of a wheel module 33 can correspond to the wheel tire 38 at the position of the ground contact point 87.

The rotor connection devices 31 in both directions along the local X-axis can be shaped in an arbitrary curved, spherically curved, or a linear manner. In the case of a linear rotor connection device, the Y-axis of the wheel member 37 corresponds to the Y-axis of the rotor 36. Depending on the construction and the application, the stators 29 can also be in direct contact.

Stator Connection Devices

The stators 29 of the wheel modules 33 are connected to one another by way of at least one arbitrary stator connection device 21. The stator connection device 21 consisting of one or a plurality of fixed and/or kinematic stator struts 81, stator shells 101, stator shell segments 102, dynamic devices, covered cloth devices, and/or arbitrary kinematic devices may be connected directly to the load member 11 and/or indirectly to the latter by way of an arbitrary load support device 26. The load member 11 may be larger or smaller than the device.

Stator Shells/Access/Door Device

The stator connection device 21 in FIG. 1 is composed of a spherical geometry. The two inner parallel kinematic platforms 18 of the parallel kinematic devices 17 can be connected directly to one another or by way of an arbitrary load support device 26, or may be integral. In the present exemplary applications, the inner parallel kinematic platforms 18 by a transparent solid member in the shape of a spherical segment are connected to one another by way of a stator connection device 21. Access to the load member in 11 is thus possible from the front and/or from the rear. The stator connection device 21 is composed of at least one fixed stator fixed connection 99 and at least one radially kinematic part, hereunder also referred to as a door device 25. The door devices 25 by way of manual or arbitrary kinematic devices are connected to one another so as to be radially movable conjointly with the inner parallel kinematic platforms 18 about the global X-axis 3.

Energy Conversion/Energy Recovery Method/Shell Properties

The rotor connection devices 31 and/or the stator connection devices 21 can be support devices for different, application-dependent devices.

The device can be combined with devices for converting solar energy and/or wind energy to electric energy. The energy is stored in energy storage devices 39.

Arbitrary drive and/or energy recovery devices such as motors 60 and/or generators 85, energy recovery by devices for converting the force impulses of the shock absorbers to electric energy and/or in hydraulic spring or air pressure storage devices, and/or devices for converting energy, for example in the form of solar cells, and/or for utilizing wind power as a result of the use of the wheel modules 33 as wind rotors in the form of a direct drive, having the struts 32 as fixed or adjustable rotor airfoil 103, and/or as a photovoltaic device 104, can be used as energy conversion devices 65.

The stator connection devices 21 and rotor connection devices 31 having lateral shells 105 in the shape of spherical segments can be connected in an arbitrary manner to, or be composed of, transparent or partially transparent devices and/or material parts of acrylic glass, having fixed or dynamic photovoltaic installations 104 which for example in the form of interlinked textile cloth structures are cast therein and/or attached to the external walls.

The photovoltaic device 104 in its entirety, or in the form of photovoltaic segments 106 at a specific mutual spacing, can be connected in an arbitrary manner to the device. In the present exemplary applications, the photovoltaic segments 106, having transparent rotor full shells 63 connected to the rotor 36, as well as in the case of transparent stator shells 101, are installed in an annular arrangement as the load support device 26. As a result of the annular arrangement and the specific spacings between the photovoltaic segments 106 distributed on a plurality of circles having different diameters outside the field of view, partial transparency of the rotating rotor full shells 36 is made possible as a result of the blurring effect, hereunder also referred to as the stroboscope effect. As a result, part of the solar light also reaches the inner shell device having the inner photovoltaic segments 106.

The device can be used vertically or horizontally, fixed in situ, partially fixed, on the water 13, and/or within the water 13 in combination with kinematic struts 32 of corresponding shape, by means of swash plate methods and the photovoltaic device 104, as a generator for harvesting water, tides, and as a solar power station.

The device may also be composed of one or a plurality of base modules 16 without a wheel member 37.

Visual Display of Speed and Rotations

The stroboscope effect, as a result of the rotating photovoltaic segments 106 of the rotor full shell 63 of the wheel module 33 and as a result of the specific disposal of the photovoltaic segments 106 on the rotating, transparent rotor full shells 63 or rotor shell segment 64 and/or so as to be superimposed on the inside of the wheel member 37, or in combination with photovoltaic segments 106 and/or arbitrary signaling marks on the stator shell segments 102, and/or as a result of the rotor full shells 63 in combination with a directed light source, without any further device can also be utilized for drawing conclusion pertaining to the speed and the rotating speed of the rotors 36.

Multi-Functional Two-Part Highway Traffic Module

The device can be connected to a multi-functional two-part highway traffic module 107. The two parts on the external side of the wheel modules 33 are in each case connected to the external sides of the stators 29 in a fixed manner or so as to be pivotable about the local X-axes 6. For example, the modules can have the functions as a passive water wiper 108 and a signaling device, and/or be used for mechanically cleaning the glass of the rotor connection devices 31 for the purpose of actively wiping off the water on the rotor full shells 63. A contactless cleaning of the glass of the rotor full shells 63 is possible by way of a funnelshaped high-pressure injection method with a water recovery system. In the case of wheel modules 33 having rotor full shells 63, the cleaning water from a water jet flowing along the radius is injected under high pressure at a suitable angle onto the rotating rotor full shells 63 and in the reflection angle of the water jet is immediately suctioned again, returned and cleaned. This principle is suitable inter alia also for storing rainwater.

Load Volume Extension

A base module 16 rolling on the ground 12 can be connected to at least one arbitrary load volume extension module 110 in the form of a base module connection device 44, also referred to as a base connection module 45, with or without at least one additional rotation device 14 at the front, the rear, on the left and/or on the right. The base connection module 45 in the form of a hitch device 109 can be connected to at least one additional passive or active rotation device 14 or auxiliary wheel 48 in a fixed or arbitrary kinematic manner by way of one or a plurality of base module connection axes 132, or connected to the base module 16 in an arbitrary kinematic manner. The rotation device 14 can be composed of, for example, a passive kinematic trailing wheel as the auxiliary wheel 48. The hitch device 109 can be connected to the base module 16 in a parallel kinematic and/or arbitrary manner. At least two base modules 16 can also be connected directly to one another.

A load volume extension module 110 can kinematically connect a plurality of base modules 16 in series behind one another by way of a base module connection device 44, and/or in arbitrary kinematic manner. The base module connection device 44 is comparable to the principle of a litter 46. The properties of the disposal in series behind one another in the case of two base modules 16 corresponds to a conventional vehicle having four wheels with a geometric driving track. The base module connection device 44 in an arbitrary serial kinematic and/or parallel kinematic manner, in the A, H and V wheel angle position, by way of one or a plurality of fixed stator connection devices 21 can be connected centrally to the base modules 16, and/or in all wheel angle positions be connected laterally to the base modules 16 by way of the stators 29. In the case of a central base module connection device 44, the base modules 16 can be pivoted by 360° about the global Y-axis 4 thereof. A device having one base module connection device 44 having two base modules 16 can thus travel forward as well as laterally while rolling on the ground 12. The connection can be established manually and/or automatically. More than two base modules 16 can be connected to one another by way of more than one base module connection device 44 that is able to be inclined laterally and longitudinally in one dimension, for example in the form of a bus chain, or in a plurality of dimensions as a network which is linked in series behind one another and/or in parallel next to one another and/or as a three-dimensional electromechanical network.

A base module connection device 44 having one or a plurality of temporary auxiliary wheels 48 can for the purpose of automatic connection maneuvers and/or a compact parking area also be temporarily pulled or pushed by only one base module 16 in the form of a hitch device 109.

Mechanical Modification/Disassembling Method

The device, depending on the construction, can be manually, automatically and/or autonomously upgraded, reduced, constructed and/or disassembled. The individual functional groups and/or components can be connected to one another by quick-release couplings such as ball joint closure devices 28. The protective devices 111 can be composed of transparent, nested folding devices. The wheel members 37 and wheel tires 38 can be composed of one wheel member 37 or a plurality of wheel member segments 50 and of one wheel tire 38 or a plurality of wheel tire segments 51. This enables inter alia a production method in the form of preassembled functional groups which are nested in one another and shipped for the purpose of decentralized final assembling.

The rotor connection device 31 can be composed of a three-point connection having three re-closable ball joint couplings, also referred to as the ball joint closure device 28, as a temporary connection between the rotor 36 and the wheel member 37. Here, one ball joint closure device 28 of the wheel module 33 is in each case released from the wheel member 37 at a radial position dependent on the application. It is thus possible for the wheel module 33 to be opened and closed about the two closed ball joint closure devices 28. As a result, lateral access to the load member 11 and/or to the load support device 26 is possible, in addition to the possibility of temporary disassembling.

Modes of Travel and Movements on the Spot without Upgrade Modules

The device in the vertical position, having the Y-axis in relation to the force of gravity 58, without upgrade modules enables rolling travel on the ground 12 by way of a rotation about its own global Y-axis 4 on the spot, rolling forward at identical or different wheel angles 93 inter alia in the A, H, V and I wheel angle position, and/or laterally in steps on a level or inclined plane, stairs and uneven terrain, and/or floating on a medium such as water 13.

The swash plate method describes the struts 32 which in this context are also referred to as rotor struts 35 which, by way of the rotor strut longitudinal axis, also referred to as the rotor strut axis 34, are kinematically connected to the wheel module 33, said rotor struts 35 as a function of the radial position of the wheel module 33 potentially having different positions. As a result, differential control between the two wheel modules 33 as well as within one wheel module 33 is possible.

The device in combination with a swash plate method enables horizontal and/or vertical travel without an upgrade module on the ground 12 and/or within a medium such as air and/or water 13 and/or in a vacuum.

In the case of a platform pivot device 84 connected to the inner parallel kinematic platform 18, or having a further stacked parallel kinematic device 17, the outer parallel kinematic platform 18 can have a horizontal position that is parallel to the global X-axis 3. This corresponds to a wheel angle of 90° of the T wheel angle position. In combination with the rotating wheel modules 33, the device can be used as a two-rotor helicopter device according to a mechanical and/or electromechanical swash plate method. The base module 16 on the ground 12 here by way of the stator connection device 21 is connected to the ground 12 by means of an arbitrary fixed and/or kinematic foot device and/or arbitrary rotation device 14.

The device in combination with a swash plate method enables inter alia horizontal travelling as a seal device rolling on the ground 12 or on the water 13 in the form of a direct wind drive, or a stationary and/or travelling wind turbine device 112. The swash plate method can be performed mechanically, electronically, electromechanically in a centrally and/or decentrally controlled manner. In a decentrally controlled swash plate method, the struts 32 which in the form of wind blade sails 113 with wind sensors on the struts 32 are movable about the strut longitudinal axis 92, for example, can be moved directly without any electronic central control. The decision process takes place directly between the sensors and the kinematic device for moving the struts 32. A spring device in conjunction with the influence of force of a medium, as natural sensors and actuators, can also control the strut position of the struts 32 without electronic sensors and actuators. As a result, the strut angles by detecting the wind direction in relation to the driving direction and further parameters, can be moved in an autonomous, locally controlled manner by means of an arbitrary kinematic device. As a result of the immediate response of a transformation of the wheel angle 93 to an A wheel angle position in the event of an influence by side wind forces, this method is also suitable as a safety device.

The device without upgrade modules enables an uprighting method of the base module 16 on the ground 12, between a vertical position having the global Y-axis 4 in the direction of the force of gravity 58 and contact between the wheel members 37 and/or wheel tires 38 and the ground 12, a horizontal position having the global X-axis 3 in the direction of the force of gravity 58, and/or an oblique position with and/or without contact between the wheel members 37 and/or wheel tires 38 and the ground 12, while lying sideways in situ. Depending on the application, this is possible inter alia by an electronically controlled, helical movement algorithm by way of the drive devices 61 of the wheel modules 33, in combination with a parallel kinematic stator connection device, as well as kinematic energy storage devices 39, without further devices, and/or for example by way of an elastic impact protection device in the form of a corresponding edge protection device 114.

The device enables horizontal travel without upgrade modules so as to float on a medium such as water 13 having a vertical global Y-axis 4, by way of fixed struts 32, or struts 32 which are moved in an arbitrary kinematic differential manner, as side-wheeler paddles 129. In the case of the closed base module 16 in the I wheel angle position, the immersion depth can take place by way of an arbitrary pump device for the purpose of controlling in a closed-loop manner the water proportion between the wheel modules 33 having rotor full shells 63 and the stator connection device 21 having closed stator shell segments 102.

Conveying a Single Wheel Module on the Ground

The base module 16, reduced to one wheel module 33, can be used as an independent device for conveying. This is the case, for example, in the application of a single rotation device 14 so as to roll on the ground 12, having a parallel kinematic connection of a stator 29 to the load member 11 by way of an asymmetrical stator extension 115 having an asymmetrical load support device 116, in the form of an asymmetrical unicycle having a support device 117 with or without a stabilizer wheel 118, a manual or electrical balancing technology, for example by way of the parallel kinematic device, and/or when applying an arbitrary gyrotechnology.

Modes of Travel with Upgrade Modules

The device enables horizontal and/or vertical travel with upgrade modules within a medium such as air and/or water 13 and/or in a vacuum, and/or when connected in an arbitrary fixed and/or kinematic manner to at least one arbitrary thrust device 42, levitation devices and/or arbitrary devices for travel within a medium and/or in a vacuum in a horizontal and/or vertical position.

The present exemplary applications in FIG. 1 are mechanical thrust devices 42. The thrust devices 42 by way of an arbitrary articulated mechanism outside the wheel modules 33 are connected to the stators 29 so as to be pivotable about the local X-axes by a thrust connection device 119. Each thrust device 42 is composed of one, two or, for the purpose of reducing vibrations and noise emissions, an even number of turbine wheels 121 which rotate about the thrust device rotor axis 120 and are disposed behind one another. The disposal of a plurality of turbine wheels 121 behind one another enables a construction mode which is compact in comparison to the thrust force. Each turbine wheel 121 rotates in a rotating direction that is opposite to that of the adjacent turbine wheels 121. The turbine wheels 121 are operated by bearingless torque motors which as internal rotor motors have a hollow shaft. The mutual rotating speeds of the turbine wheels 121 may vary for the purpose of a compression method of the air in comparison to the travel speed. The turbine wheels 121 can have different numbers of turbine blades 122. When using in each case two pivotable thrust devices 42 on both sides, horizontal and/or vertical travel within a medium such as air or water is possible. Travel in a vacuum is also possible in the case of a corresponding thrust device.

The device enables horizontal travel with an upgrade module within a medium such as air and/or a water when connected in an arbitrary fixed and/or kinematic manner to at least one arbitrary airfoil device 43.

An airfoil segment 123 can be composed of one part or a plurality of parts. An airfoil segment 123 by way of a pivot device 83 can be pivoted about the upper thrust device longitudinal axis 124 from a vertical to a horizontal position during travel. The present exemplary applications in FIG. 1 are a two-part airfoil device 43. The airfoil device 43 is composed of two airfoil segments 123 which by way of an arbitrary kinematic device pivotable about the thrust device longitudinal axis 124 and in the horizontal position by way of an airfoil connection device 125 in the form of a ball joint closure device 28 with a socket is connected in a punctiform manner by way of connected surfaces to airfoil segments 123, or not mechanically connected to the latter. In the case of a punctiform ball joint connection of the airfoil device 43, the airfoil segments 123 are kinematically connected to one another in all degrees of freedom. In the case of a parallel kinematic or an arbitrary airfoil connection device having a punctiform or without a direct connection of the airfoil segments 123, the device can also be controlled by the parallel kinematic device, without control flaps 126. The airfoil segments 123 in the internal region of the airfoil, in a manner comparable to the principle of a double-decker, are composed of a lower airfoil region 127 and an upper airfoil region 128. The airfoil device 43 can be operated in combination with at least one central thrust device 42, or at least one thrust device 42 on both sides. Part of the airfoil connection device 125 in the present exemplary application corresponds to the outer part of the upper thrust device that is connected so as to be pivotable about the thrust device rotor axis 120.

Mechanical Ground Connection Devices for the Purpose of Transmitting Data and Energy, Docking Stations The device for the purpose of transmitting energy, data and/or for performing an arbitrary operation can be connected to an arbitrary connection device in and/or outside the device. The present figures illustrate a plurality of variants of mechanical connections to the ground 12 in the form of ground connection devices 54 having energy lines 133 and data lines 134. The connection can be stationary, kinematic, fixed or contactless. Various central and decentralized ground connection devices 54 are illustrated in FIGS. 1, 3, 5 and 8.

Exemplary Applications of Base Modules as a Tracker Device for Utilizing Solar and/or Wind Energy A wheel module 33 as a tracking device, also referred to as the tracker device 41, for example for harvesting solar and/or wind energy, by means of arbitrary ground connection devices 54 can be connected to the ground 12 directly or indirectly in a fixed and/or kinematic manner by way of the stator 29. Depending on the application, the concave, convex or linear internal sides as well as the external sides of the rotor shells 62 can be utilized.

The tracker device 41 can be composed of a specifically opened base module 16 which by way of a central ground connection device 54 having a mechanical latching bearing mechanism and a spring coupling is connected to the ground 12. In the case of an open parallel kinematic base module 16 having wheel modules 33 which are not parallel, the sunlight can be further dispersed, for example by way of the on the spherical partially transparent stator shell 101 having photovoltaic segments 106 and a light-reflecting surface onto the internal sides of the photovoltaic cells on the internal side of the wheel modules 33. The vertical tracking of the sun about the global X-axis 3 is possible by way of the parallel kinematic device. The horizontal tracking about the global Y-axis 4 is possible by lifting the base module 16 by way of the parallel kinematic device 17 as a result of contact between the ground and the wheel modules, pivoting by the wheel modules 33, and subsequently lowering the base module 16 back to the new latching position of the latter. This results in the possibility of a tracking method for tracking the position of the sun without any additional kinematic device on the part of the ground connection device 54.

By virtue of the properties and the circular geometry of the base module 16, the device, even without ground connection devices 54, can also be used as a photovoltaic tracker device 41 in a stationary manner in situ.

Exemplary Application of a Manually Controlled Base Module

A manual, parallel kinematic control method having an arbitrary drive device for operating a device for conveying at least one person 9 may be mentioned as an example of an application of a single base module 16. The control method of the wheel modules 33 can be transmitted hydraulically, pneumatically and/or electrically by way of a steering and control device, comparable to a motorcycle steering device. The steering device is mechanically connected to the base module 16 and/or connected to the latter in a remote-controlled manner by way of an arbitrary wireless connection. The device can thus be controlled for performing an arbitrary operation within and outside the base module 166. The steering device is composed of as a functional parallel kinematic model of the base module 16 in the form of two control joysticks in the center of the steering device. The steering device handles are in each case connected to the outer parallel kinematic platforms 18 of the model. The corresponding positions of the parallel kinematic devices of the parallel kinematic model are transmitted proportionally to the parallel kinematic devices 17 of the base module 16 by way of hydraulic, pneumatic and/or electric amplification devices. The reference positions as well as delimitation positions in the model can be enabled by way of corresponding magnetic mechanisms, spring mechanisms and delimitation mechanisms.

Controlling the device including the parallel kinematic device is thus possible without electronic controls.

Exemplary Application of an Electromechanical Network

A device for mechanically cleaning and/or cultivating land and/or water by means of methods within and/or outside the base modules 16 for the purpose of collecting, sorting, recycling, filtering, comminuting, granulating, melting arbitrary contaminations and reshaping for the purpose of the automatic production for a manufacturing arbitrary objects, and/or for the purpose of reproducing further base modules 16 by the base modules 16 per se, in the form of an autonomously intelligent, electromechanical network may be mentioned as examples of an application of a plurality of individual and/or temporarily separated base modules 16 and/or base modules 16 connected so as to be nested and/or stacked.

Fields of Application/Embodiments

The device can exist in an arbitrary dimension, shape, such as an ultra-light, solid, compact and/or disassemblable construction mode, be driven manually and/or automatically in an arbitrary manner in different output categories, and be controlled manually, by remote control, automatically and/or autonomously by artificial intelligence.

The device can be used in the fields of application of general and/or specialized vehicle technology, transport technology, disabled transport technology, medicinal technology, off-road vehicle technology, agricultural technology, entertainment technology, toy technology, emergency services vehicle technology, waste technology, sorting technology, filtration technology, purification technology, cleaning technology, recycling technology, micro-technology, molecular technology, robotics, drone technology, watercraft technology, aircraft technology, space technology and energy harvesting technology, as well as in conjunction with artificial intelligence.

The device can be operated as a closed system in the form of a single base module 16 and/or, in conjunction with a plurality of identical and/or arbitrary connection devices, as a physically connected intelligent network which in mechanical terms is self-modifiable and self-reproducible.

LIST OF REFERENCE SIGNS

1 Global coordinate system zero point
2 Local coordinate system zero point
3 Global X-axis
4 Global Y-axis
5 Global Z-axis
6 Local X-axis
7 Local Y-axis
8 Local Z-axis
9 Person
10 Object
11 Load member
12 Ground
13 Water
14 Rotation device
15 Wheel member device
16 Base module
17 Parallel kinematic device
18 Parallel kinematic platform
19 Parallel kinematic joint
20 Symmetry axis
21 Stator connection device
22 Stator spacer device
23 Stator pivot device
24 Stator spacer segment
25 Door device
26 Load support device
27 Linear kinematic device
28 Ball joint closure device
29 Stator
30 Torque motor
31 Rotor connection device
32 Strut 33 Wheel module
34 Rotor strut axis
35 Rotor strut
36 Rotor
37 Wheel member
38 Wheel tire
39 Energy storage device
40 Ground connection module
41 Tracker device
42 Thrust device
43 Airfoil device
44 Base module connection device
45 Base connection module
46 Litter
47 Aerodynamic connection shell
48 Auxiliary wheel
49 Unicycle hitch device
50 Wheel member segment
51 Wheel tire segment
52 Coupling device
53 Energy storage foot device
54 Ground connection device
55 Main connection axis
56 Lateral connection axis
57 Shear device
58 Force of gravity
59 Rotation axis
60 Motor
61 Drive device
62 Rotor shell
63 Rotor full shell
64 Rotor shell segments
65 Energy conversion device
66 Magnetic bearing device
67 Actuator
68 Bearing device
69 Hinge device
70 Main connection shaft
71 Main connection axis
72 Control lever
73 Front shear device
74 Rear shear device
75 Left shear lever
76 Right shear lever
77 Cylinder device
78 Shock absorber
79 Ball joint
80 Serial kinematic connection device
81 Stator strut
82 Hexapod
83 Pivot device
84 Platform pivot device
85 Generator
86 Trailing angle
87 Ground connection point
88 Energy storage segment
89 Eccentric device
90 Eccentric profile axis
91 Shear device control lever
92 Strut longitudinal axis
93 Wheel angle
94 Wheel angle rotation point
95 Hydraulic cylinder
96 Longitudinal inclination angle
97 Lateral inclination angle
98 Accumulator
99 Stator fixed connection
100 Lateral window device
101 Stator shell
102 Stator shell segment
103 Rotor airfoil
104 Photovoltaic device
105 Lateral shell
106 Photovoltaic segment
107 Highway traffic module
108 Water wiper
109 Hitch device
110 Load volume extension module
111 Protective device
112 Wind turbine device
113 Wind blade sail
114 Edge protection device
115 Asymmetrical stator extension
116 Asymmetrical load support device
117 Support device
118 Stabilizer wheel
119 Thrust connection device
120 Thrust device rotor axis
121 Turbine wheel
122 Turbine blade
123 Airfoil segment
124 Thrust device longitudinal axis
125 Airfoil connection device
126 Control flap
127 Lower airfoil region
128 Upper airfoil region
129 Side-wheeler paddles
130 Energy storage pivot axis
131 Wheel member joint
132 Base module connection axis
133 Energy line
134 Data line

The invention claimed is:

1. A vehicle comprising a first vehicle part and a second vehicle part, wherein the first vehicle part comprises a first running wheel rotatable about a first rotation axis, and wherein the second vehicle part comprises a second running wheel rotatable about a second rotation axis;

wherein the first running wheel and the second running wheel have identical running wheel diameters;

wherein a first mounting for rotatably mounting the first running wheel and a second mounting for rotatably mounting the second running wheel are connected to one another by way of an articulated mechanism in such a manner that a relative mutual alignment of the first rotation axis and the second rotation axis is variable, wherein the vehicle with the aid of the articulated mechanism is able to be converted from a first driving configuration in which the first and the second rotation axes are mutually inclined to a second driving configuration in which the first and the second rotation axes are parallel, wherein in the second driving configuration a spacing of a first contact face of the first running wheel from a second contact face of the second running wheel is smaller than one tenth of the running wheel diameter, wherein the conversion from the first to the second driving configuration and from the second to the first driving configuration is possible while the vehicle is in motion, and wherein the conversion between the first driving configuration and the second driving configuration takes place automatically as a function of a driving speed of the vehicle.

2. The vehicle as claimed in claim 1, wherein the first running wheel and the second running wheel in the first driving configuration and/or in the second driving configuration contact one another in the region of the circumference of said driving wheels.

3. The vehicle as claimed in claim 1, wherein the first vehicle part and the second vehicle part are configured as planar lateral parts, in particular as half shells, which conjointly enclose a receptacle space, wherein a radial extent of the half shells is 75 to 100% of the running wheel diameter.

4. The vehicle as claimed in claim 3, wherein the running wheel diameter is at least 1.2 m, and in that the receptacle space has a platform for receiving at least one person.

5. The vehicle as claimed in claim 1, wherein the automatic conversion takes place by virtue of effective moments, without additional effective forces.

6. The vehicle as claimed in claim 1, wherein each of the vehicle parts comprises an independently controllable motor.

7. The vehicle as claimed in claim 6, wherein the motors are configured as electric motors, wherein a support device for loads to be received is disposed on the inside of at least one stator of one of the motors.

8. The vehicle as claimed in claim 7, wherein the motors are torque motors.

9. The vehicle as claimed in claim 1, wherein a pivot axis of the articulated mechanism has a radial spacing from the first rotation axis and from the second rotation axis which is at least one third of the running wheel diameter.

10. The vehicle as claimed in claim 9, wherein the radial spacing is at least 4/10 of the running wheel diameter.

11. The vehicle as claimed in claim 1, wherein the articulated mechanism is configured so as to be parallel kinematic.

12. The vehicle as claimed in claim 1, wherein the articulated mechanism is configured so as to be serial kinematic.

13. The vehicle as claimed in claim 1, comprising a support unit which is connected to the first and to the second vehicle part and has at least one further ground contact face.

14. A vehicle part for a vehicle as claimed in claim 1, comprising a running wheel rotatable about a rotation axis, a drive for the running wheel, and a connector element for an articulated mechanism.

15. A vehicle assembly comprising at least two vehicles as claimed in claim 1, said vehicles being mechanically connected to one another.

16. The vehicle assembly as claimed in claim 15, wherein the at least two vehicles are connected to one another by a connection part, wherein the connection part provides a receptacle space for loads to be received.

17. A vehicle assembly as claimed in claim 15, said vehicles being mechanically connected in a releasable manner.

18. A method for transforming a vehicle between a first driving configuration and a second driving configuration, wherein
   a) the vehicle comprises a first vehicle part and a second vehicle part, wherein the first vehicle part comprises a first running wheel rotatable about a first rotation axis, and wherein the second vehicle part comprises a second running wheel rotatable about a second rotation axis, wherein the first running wheel and the second running wheel have identical running wheel diameters; and
   b) a relative mutual alignment of the first rotation axis and the second rotation axis is varied such that the vehicle from the first driving configuration in which the first and the second rotation axes are mutually inclined is continuously converted to the second driving configuration in which the first and the second rotation axes are parallel,
   wherein the conversion from the first to the second driving configuration and from the second to the first driving configuration is possible while the vehicle is in motion, and
   wherein the conversion between the first driving configuration and the second driving configuration takes place automatically as a function of a driving speed of the vehicle.

* * * * *